US012634405B2

(12) United States Patent
Okumura et al.

(10) Patent No.: US 12,634,405 B2
(45) Date of Patent: May 19, 2026

(54) IMAGE PROCESSING APPARATUS, PRINTING SYSTEM, AND IMAGE PROCESSING METHOD FOR THIN LINE PROCESSING

(71) Applicant: SEIKO EPSON CORPORATION, Tokyo (JP)

(72) Inventors: Yoshio Okumura, Matsumoto (JP); Naoki Kayahara, Chino (JP); Tsubasa Nakatsuka, Shiojiri (JP); Yuto Tenguishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 512 days.

(21) Appl. No.: 18/456,552

(22) Filed: Aug. 28, 2023

(65) Prior Publication Data

US 2024/0070822 A1     Feb. 29, 2024

(30) Foreign Application Priority Data

Aug. 29, 2022     (JP) ................................. 2022-135650

(51) Int. Cl.
| | |
|---|---|
| *H04N 1/393* | (2006.01) |
| *G06T 3/4053* | (2024.01) |
| *G06T 5/20* | (2006.01) |
| *G06T 5/70* | (2024.01) |
| *H04N 1/407* | (2006.01) |

(52) U.S. Cl.
CPC ......... *H04N 1/3935* (2013.01); *G06T 3/4053* (2013.01); *G06T 5/20* (2013.01); *G06T 5/70* (2024.01); *H04N 1/393* (2013.01); *H04N 1/4078* (2013.01)

(58) Field of Classification Search
CPC .... H04N 1/3935; H04N 1/393; H04N 1/4078; G06T 3/4053; G06T 5/20; G06T 5/70
See application file for complete search history.

(56) References Cited

U.S. PATENT DOCUMENTS 8,988,735 B2 *    3/2015  Nakashima .............. H04N 1/58
                                                358/1.9

FOREIGN PATENT DOCUMENTS

JP        2015-053561 A      3/2015

* cited by examiner

*Primary Examiner* — Barbara D Reinier
(74) *Attorney, Agent, or Firm* — Spencer Fane LLP

(57)                ABSTRACT

An image processing apparatus includes a blurring processing unit configured to generate a blurred image by applying a two-dimensional Gaussian filter having a filter size of S1×S2 to an input image, and a resolution conversion unit configured to generate, from the blurred image, a converted image of which a resolution is converted at a first conversion magnification R1 and a second conversion magnification R2. When the blurring processing unit sets a relation of S1>S2, a relation of R2>R1 is established, and when the blurring processing unit sets a relation of S2>S1, a relation of R1>R2 is established. Here, standard deviations of the Gaussian filter are set to be standard deviations $\sigma1$ and $\sigma2$, respectively. The blurring processing unit applies the Gaussian filter having a filter coefficient of $\sigma2=\sigma1$ to the input image when S2 is different from S1.

10 Claims, 13 Drawing Sheets

PRINTING SYSTEM SY1

FIG. 4

| RESOLUTION | CONVERTED IMAGE IM2 |
|---|---|
| 600 × 300 dpi | |
| 600 × 600 dpi | |
| 600 × 900 dpi | |
| 600 × 1440 dpi | |
| 600 × 2400 dpi | |

FIG. 7

| PRINTING CONDITION C0 | | $\sigma i$ | OUTPUT RESOLUTION RE |
|---|---|---|---|
| MEDIUM ME0 | CLOTH | 0.5 | 600 × 300 dpi<br>600 × 600 dpi<br>600 × 900 dpi<br>· · · · · |
| | ME1<br>PLAIN PAPER | 1.5 | 600 × 300 dpi<br>600 × 600 dpi<br>600 × 900 dpi<br>· · · · · |
| | ME2<br>PHOTOGRAPHIC PAPER | 2.0 | 600 × 300 dpi<br>600 × 600 dpi<br>600 × 900 dpi<br>· · · · · |
| INPUT IMAGE IM1 | LINE DRAWING | 1.0 | 600 × 300 dpi ← RE1<br>600 × 600 dpi<br>600 × 900 dpi ← RE2<br>· · · · · |
| | NATURAL IMAGE GRAPHIC | 2.0 | 600 × 300 dpi<br>600 × 600 dpi<br>600 × 900 dpi<br>· · · · · |

| 0.1% | 0.2% | 0.1% |
|------|------|------|
| 1.5% | 2.4% | 1.5% |
| 6.6% | 10.9% | 6.6% |
| 10.9% | 18.0% | 10.9% |
| 6.6% | 10.9% | 6.6% |
| 1.5% | 2.4% | 1.5% |
| 0.1% | 0.2% | 0.1% |

F12

| 1.5% | 2.5% | 1.5% |
|------|------|------|
| 6.7% | 11.0% | 6.7% |
| 11.0% | 18.2% | 11.0% |
| 6.7% | 11.0% | 6.7% |
| 1.5% | 2.5% | 1.5% |

F13

| 7.5% | 12.4% | 7.5% |
|------|------|------|
| 12.4% | 20.4% | 12.4% |
| 7.5% | 12.4% | 7.5% |

F14

| 1.5% | 6.7% | 11.0% | 6.7% | 1.5% |
|------|------|-------|------|------|
| 2.5% | 11.0% | 18.2% | 11.0% | 2.5% |
| 1.5% | 6.7% | 11.0% | 6.7% | 1.5% |

FIG. 12

COMPARATIVE EXAMPLE

FIG. 13

IMAGE PROCESSING APPARATUS, PRINTING SYSTEM, AND IMAGE PROCESSING METHOD FOR THIN LINE PROCESSING

The present application is based on, and claims priority from JP Application Serial Number 2022-135650, filed Aug. 29, 2022, the disclosure of which is hereby incorporated by reference herein in its entirety.

BACKGROUND

1. Technical Field

The present disclosure relates to technology for converting the resolution of an image.

2. Related Art

In order to convert the resolution of an image including a plurality of pixels arranged in two directions orthogonal to each other, the number of pixels of the image is converted by an interpolation operation using a bicubic method or the like. The conversion for increasing the resolution of an image increases the number of pixels of the image, and the conversion for decreasing the resolution of the image decreases the number of pixels of the image. Here, two directions orthogonal to each other are defined as an X direction and a Y direction. In particular, when the resolution of an image is low, some of the plurality of pixels included in the image are not used for resolution conversion, and some of them have a small weight during an interpolation operation. Consequently, blurring processing for applying a Gaussian filter to an image is performed before the resolution conversion.

A printed matter inspection apparatus disclosed in JP-A-2015-53561 performs smoothing on a raster image processor (RIP) image before resolution conversion using a Gaussian filter. The filter size of the Gaussian filter used is the same size in X and Y directions, such as a size of 3×3. A smoothing coefficient σ of the Gaussian filter, that is, a standard deviation, increases as the number of printed lines of the printed matter decreases.

When a conversion magnification of a resolution is different between the X direction and the Y direction, when resolution conversion of an image including thin lines is performed, the thickness of the thin line may be inappropriately changed or the thin line may be disconnected depending on the conversion magnification in each direction in the converted image. For example, when a Gaussian filter having the same filter size in the X direction and the Y direction is applied to an image and a smoothing coefficient σ increases as a resolution decreases, thin lines in the Y direction become thin and thick when a conversion magnification in the Y direction becomes smaller than a conversion magnification in the X direction. Thin lines oriented closer to the Y direction than to the X direction may be disconnected. Consequently, even when the conversion magnification of the resolution is different between the X direction and the Y direction, it is desirable to appropriately convert the thin lines while obtaining an appropriate blurring effect.

SUMMARY

An image processing apparatus according to the present disclosure is an image processing apparatus configured to execute image processing for acquiring a converted image of which a resolution is converted based on an input image including a plurality of pixels arranged in a first direction and in a second direction intersecting the first direction, the image processing apparatus including a blurring processing unit configured to generate a blurred image by applying, to the input image, a two-dimensional Gaussian filter having a first filter size in the first direction and a second filter size in the second direction, and a resolution conversion unit configured to generate, from the blurred image, the converted image of which the resolution is converted at a first conversion magnification that is a conversion magnification of the resolution in the first direction and at a second conversion magnification that is a conversion magnification of the resolution in the second direction, wherein the second conversion magnification is larger than the first conversion magnification when the blurring processing unit makes the first filter size larger than the second filter size, the first conversion magnification is larger than the second conversion magnification when the blurring processing unit makes the second filter size larger than the first filter size, a standard deviation σ of the Gaussian filter in the first direction is set to be a standard deviation σ1, a standard deviation σ of the Gaussian filter in the second direction is set to be a standard deviation σ2, and the blurring processing unit applies, to the input image, the Gaussian filter having a filter coefficient in which the standard deviation σ2 is equal to the standard deviation σ1 when the second filter size is different from the first filter size.

In addition, a printing system of the present disclosure includes the image processing apparatus, a printing head including a plurality of nozzles and configured to eject a liquid onto a medium, and a control unit configured to control the ejection of the liquid from the printing head so that a print image based on the converted image is formed on the medium.

Further, an image processing method of the present disclosure is an image processing method of acquiring a converted image of which a resolution is converted based on an input image including a plurality of pixels arranged in a first direction and a second direction intersecting the first direction, the image processing method including a blurring processing step of generating a blurred image by applying, to the input image, a two-dimensional Gaussian filter having a first filter size in the first direction and a second filter size in the second direction, and a resolution conversion step of, generating, from the blurred image, the converted image of which the resolution is converted at a first conversion magnification that is a conversion magnification of the resolution in the first direction and at a second conversion magnification which is a conversion magnification of the resolution in the second direction, in which the second conversion magnification is larger than the first conversion magnification when the first filter size is larger than the second filter size in the blurring processing step, the first conversion magnification is larger than the second conversion magnification when the second filter size is larger than the first filter size in the blurring processing step, a standard deviation σ of the Gaussian filter in the first direction is set to be a standard deviation σ1, a standard deviation σ of the Gaussian filter in the second direction is set to be a standard deviation σ2, and the Gaussian filter having a filter coefficient in which the standard deviation σ2 is equal to the standard deviation σ1 is applied to the input image when the second filter size is different from the first filter size in the blurring processing step.

BRIEF DESCRIPTION OF THE DRAWINGS

FIG. 4 is a diagram schematically illustrating an example of a relationship between a conversion magnification of a resolution and a filter size of a Gaussian filter.

FIG. 7 is a diagram schematically illustrating an example of a converted image obtained from an input image including vertical thin lines by changing a resolution in the Y direction.

FIG. 8 is a diagram schematically illustrating an example of a standard deviation σi associated with each printing condition.

FIG. 12 is a diagram schematically illustrating an example of a filter coefficient of a Gaussian filter.

FIG. 13 is a diagram schematically illustrating a comparative example of a converted image obtained from an input image including vertical thin lines by changing a resolution in the Y direction.

DESCRIPTION OF EMBODIMENTS

Figure 1:
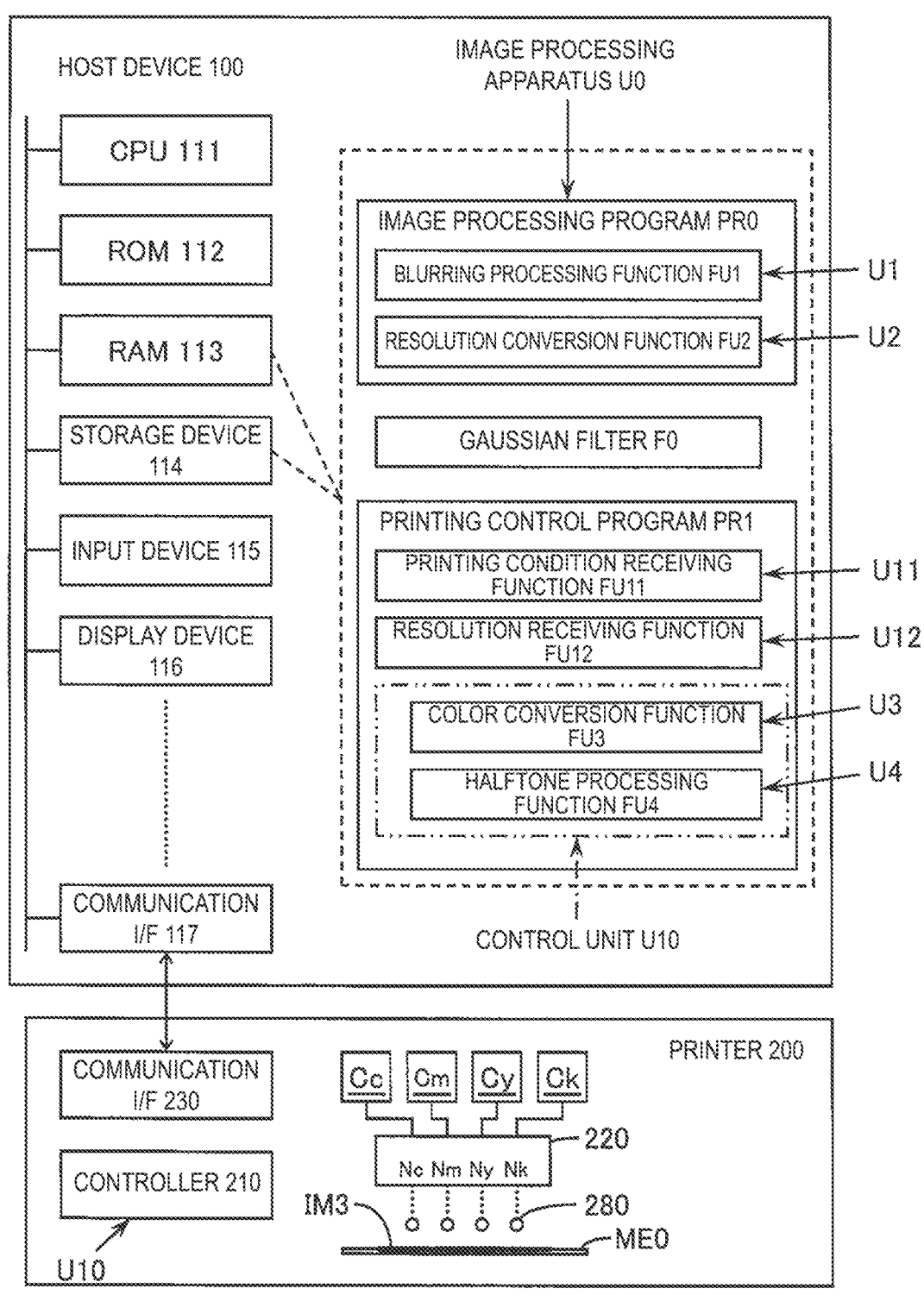
FIG. 1 is a block diagram schematically illustrating a configuration example of a printing system including an image processing apparatus.

Exemplary embodiments of the disclosure will be described. Of course, the following exemplary embodiments only illustrate the disclosure, and not all features illustrated in the exemplary embodiments are indispensable for the solution of the disclosure.

(1) OVERVIEW OF TECHNOLOGY INCLUDED IN PRESENT DISCLOSURE

First, an overview of technology included in the present disclosure will be described with reference to examples illustrated in FIG. 1 to FIG. 13. Note that the drawings of the present application schematically illustrate the examples, that an enlargement factor in each direction illustrated in each drawing may vary among the drawings, and that the drawings may not be consistent with one another. Of course, the elements of the technology are not limited to specific examples illustrated with reference numerals. Note that in the section "Overview of technology included in present disclosure", a word included in parentheses is for supplementary description of the immediately preceding word.

Aspect 1

Figure 2:
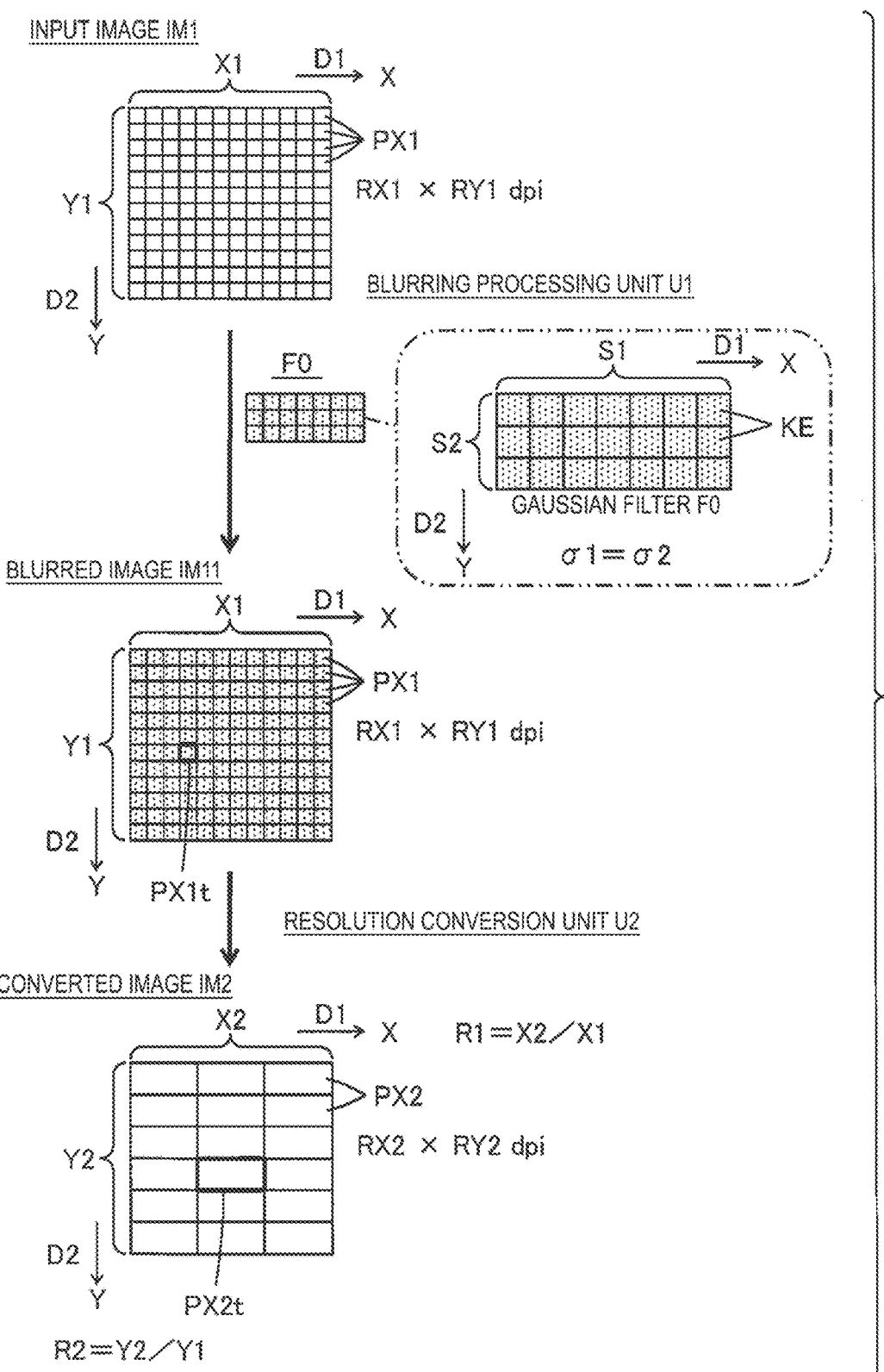
FIG. 2 is a diagram schematically illustrating an example in which a converted image in which a vertical conversion magnification is larger than a horizontal conversion magnification is generated after performing blurring processing using a horizontally long Gaussian filter.
Figure 3:
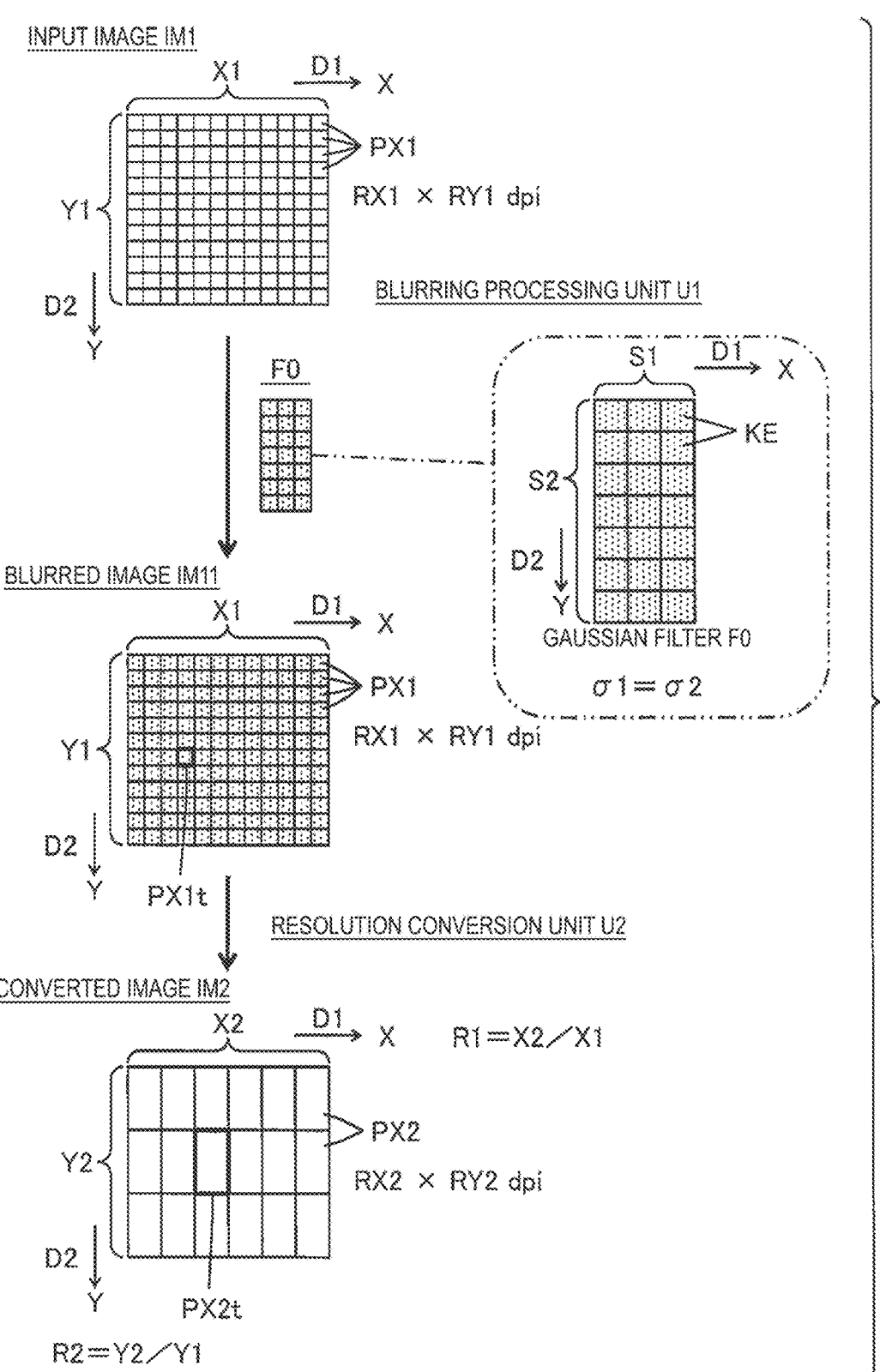
FIG. 3 is a diagram schematically illustrating an example in which a converted image in which a horizontal conversion magnification is larger than a vertical conversion magnification is generated after performing blurring processing using a vertically long Gaussian filter.

As illustrated in FIGS. 2 and 3 and the like, an image processing apparatus U0 according to an aspect of the present technology is an image processing apparatus U0 configured to execute image processing for acquiring a converted image IM2 of which the resolution is converted, based on an input image IM1 including a plurality of pixels PX1 arranged in a first direction D2 and in a second direction D2 intersecting the first direction D1. The image processing apparatus U0 includes a blurring processing unit U1 and a resolution conversion unit U2. The blurring processing unit U1 can generate a blurred image IM11 by applying a two-dimensional Gaussian filter F0 having a first filter size S1 in the first direction D1 and a second filter size S2 in the second direction D2 to the input image IM1. The resolution conversion unit U2 can generate the converted image IM2 of which the resolution is converted at a first conversion magnification R1, which is a conversion magnification of the resolution in the first direction D1, and at a second conversion magnification R2, which is a conversion magnification of the resolution in the second direction D2 from the blurred image IM11. As illustrated in FIG. 2, when the blurring processing unit U1 makes the first filter size S1 larger than the second filter size S2, the second conversion magnification R2 is larger than the first conversion magnification R1. As illustrated in FIG. 3, when the blurring processing unit U1 makes the second filter size S2 larger than the first filter size S1, the first conversion magnification R1 is larger than the second conversion magnification R2. Here, a standard deviation σ of the Gaussian filter F0 in the first direction D1 is defined as a standard deviation σ1, and a standard deviation σ of the Gaussian filter F0 in the second direction D2 is defined as a standard deviation σ2. When the second filter size S2 is different from the first filter size S1, the blurring processing unit U1 applies the Gaussian filter F0 having a filter coefficient KE in which the standard deviation σ2 is equal to the standard deviation σ1 to the input image IM1.

The blurring processing unit U1 according to the aspect described above can apply the Gaussian filter F0 in which the second filter size S2 is different from the first filter size S1 to the input image IM1. On the other hand, even when the second filter size S2 is different from the first filter size S1, the standard deviation σ2 of the Gaussian filter F0 in the second direction D2 is equal to the standard deviation σ1 of the Gaussian filter F0 in the first direction D1.

As illustrated in FIG. 2, when the second conversion magnification R2 of the resolution in the second direction D2 is larger than the first conversion magnification R1 of the resolution in the first direction D1, the following effects are obtained when the Gaussian filter F0 having the first filter size S1 larger than the second filter size S2 is applied to the input image IM1.

Since a blurring range in the first direction D1 is wider than a blurring range in the second direction D2, connection of thin lines L0 oriented closer to the first direction D1 than to the second direction D2 is secured. In addition, since the blurring range in the second direction D2 is narrower than the blurring range in the first direction D1, excessive blurring does not occur in the second direction D2. Further, since the standard deviation σ2 in the second direction D2 is equal to the standard deviation σ1 in the first direction D2 in the Gaussian filter F0, blurring effects in the first direction D1 and the second direction D2 are appropriate, and a blurring effect in an oblique direction between the first direction D1
and the second direction D2 is also appropriate.

As illustrated in FIG. 3, when the first conversion mag-
nification D1 of the resolution in the first direction R1 is
larger than the second conversion magnification D2 of the
resolution in the second direction R2, the following effects
are obtained when the Gaussian filter F0 having the second
filter size S2 larger than the first filter size S1 is applied to
the input image IM1.

Figure 6:
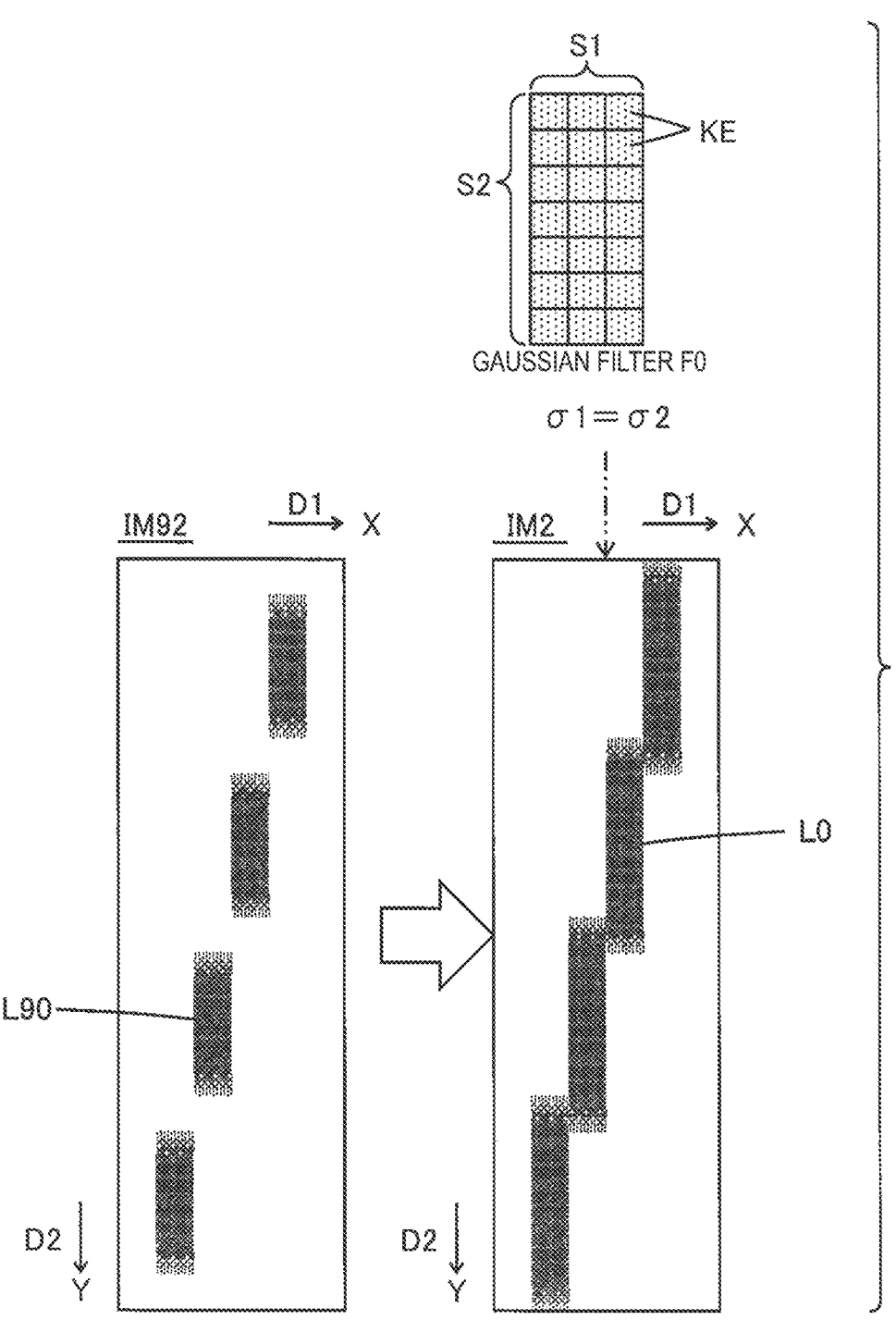
FIG. 6 is a diagram schematically illustrating an example of an oblique line after resolution conversion.

Since the blurring range in the second direction D2 is
wider than the blurring range in the first direction D1,
connection of the thin lines L0 oriented closer to the second
direction D2 than the first direction D1 is secured as illus-
trated in FIG. 6. In addition, since the blurring range in the
first direction D1 is narrower than the blurring range in the
second direction D2, excessive blurring does not occur in the
first direction D1. Further, since the standard deviation σ1 in
the first direction D1 is equal to the standard deviation σ2 in
the second direction D2 in the Gaussian filter F0, blurring
effects in the second direction D2 and the first direction D1
are appropriate, and a blurring effect in an oblique direction
between the second direction D2 and the first direction D1
is also appropriate.

As described above, the above-described aspect can pro-
vide an image processing apparatus capable of acquiring a
converted image in which thin lines are appropriately con-
nected when a conversion magnification of a resolution
varies depending on a direction.

Here, the conversion of a resolution of an input image
means conversion of performing at least one of enlargement
for increasing the number of pixels and reduction for reduc-
ing the number of pixels in at least one of the first direction
and the second direction. Thus, the conversion of the reso-
lution of the input image includes, for example, conversion
for changing the number of pixels in the first direction and
not changing the number of pixels in the second direction,
conversion for increasing the number of pixels in the first
direction and decreasing the number of pixels in the second
direction, and the like.

In the present application, "first", "second", . . . are terms
for distinguishing components included in a plurality of
components having similarities, and do not indicate an order.
Which components among the plurality of components
"first", "second", . . . are applied to is relatively determined.
For example, when a plurality of first pixels of an input
image are arranged in the X direction and the Y direction, the
Y direction corresponds to the second direction when the X
direction corresponds to the first direction, and the X direc-
tion corresponds to the second direction when the Y direc-
tion corresponds to the first direction.

The first conversion magnification means a ratio of the
number of pixels in the first direction of the converted image
to the number of pixels in the first direction of the input
image. When the first conversion magnification is smaller
than 1, resolution conversion for decreasing the number of
pixels in the first direction is performed, and when the first
conversion magnification is larger than 1, the resolution
conversion for increasing the number of pixels in the first
direction is performed.

The second conversion magnification means a ratio of the
number of pixels in the second direction of the converted
image to the number of pixels in the second direction of the
input image. When the second conversion magnification is
smaller than 1, resolution conversion for decreasing the
number of pixels in the second direction is performed, and
when the second conversion magnification is larger than 1, resolution conversion for increasing the number of pixels in
the second direction is performed.

The first filter size refers to the number of filter coeffi-
cients in the first direction of the Gaussian filter.

The second filter size refers to the number of filter
coefficients in the second direction of the Gaussian filter.

The fact that the standard deviation σ2 is equal to the
standard deviation σ1 is not limited to the fact that the
standard deviations σ1 and σ2 obtained from the filter
coefficients are completely the same, and includes the fact
that the standard deviations σ1 and σ2 obtained from the
filter coefficients are substantially the same. For example,
the filter coefficient obtained from the standard deviations
σ1 and σ2 satisfying σ1=σ2 has a different error depending
on the filter size or the like. Thus, the standard deviations σ1
and σ2 obtained from the filter coefficients may be substan-
tially the same.

Note that the description above also applies to the fol-
lowing aspects.
Aspect 2

Figure 9:
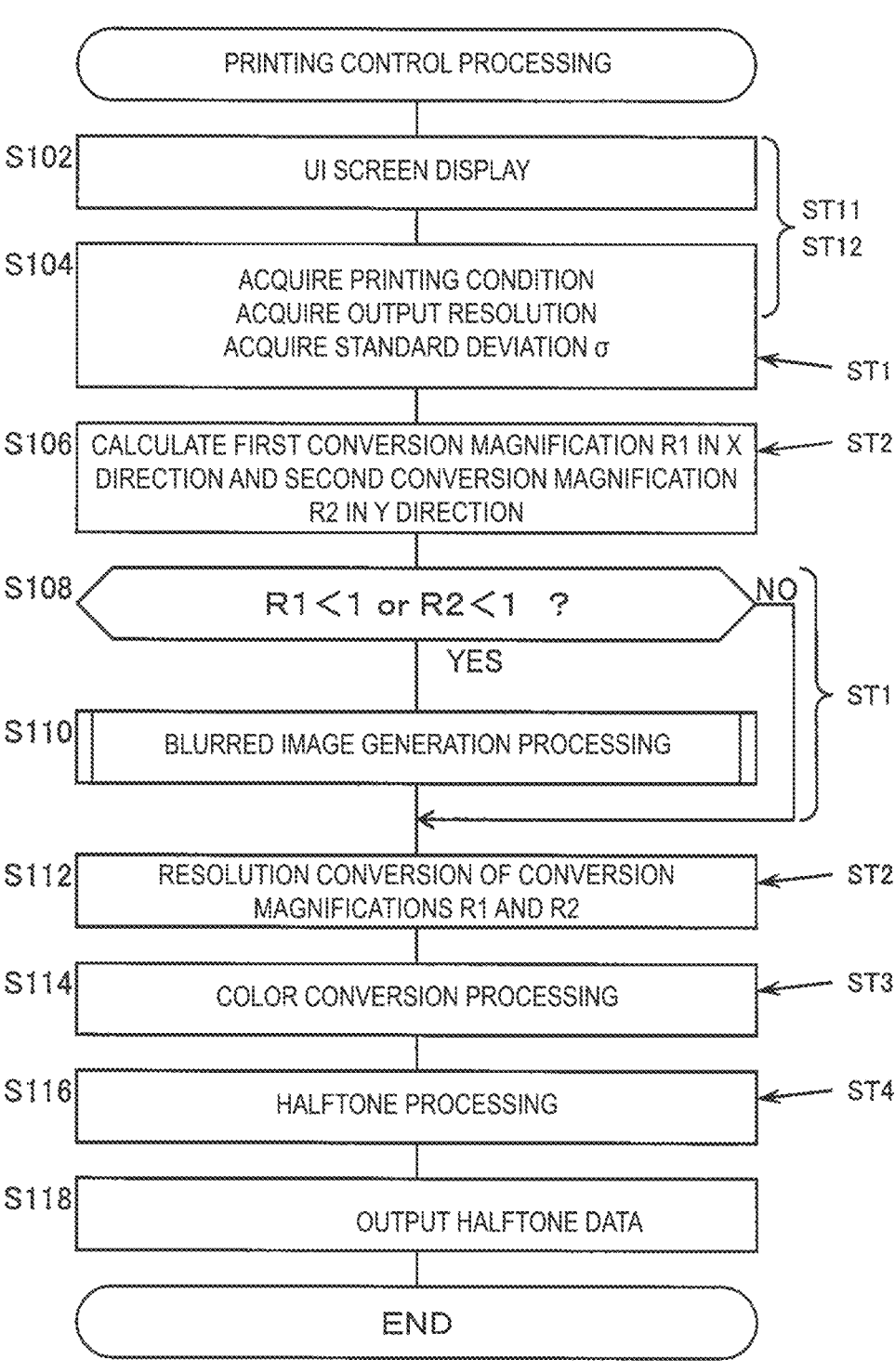
FIG. 9 is a flowchart schematically illustrating an example of printing control processing.

As illustrated in FIG. 9, when at least one of the first
conversion magnification R1 and the second conversion
magnification R2 is smaller than 1, the blurring processing
unit U1 may generate the blurred image IM11. When the
first conversion magnification R1 and the second conversion
magnification R2 are equal to or greater than 1, the resolu-
tion conversion unit U2 may generate the converted image
IM2 of which the resolution is converted at the first con-
version magnification R1 in the first direction D1 and the
second conversion magnification R2 in the second direction
D2 from the input image IM1.

When resolution conversion for increasing the number of
pixels is performed, the influence of image quality on the
converted image IM2 is small even when blurring process-
ing is not performed. Thus, the above-described aspect can
shorten a processing time at the time of image enlargement.
Aspect 3

Figure 11:
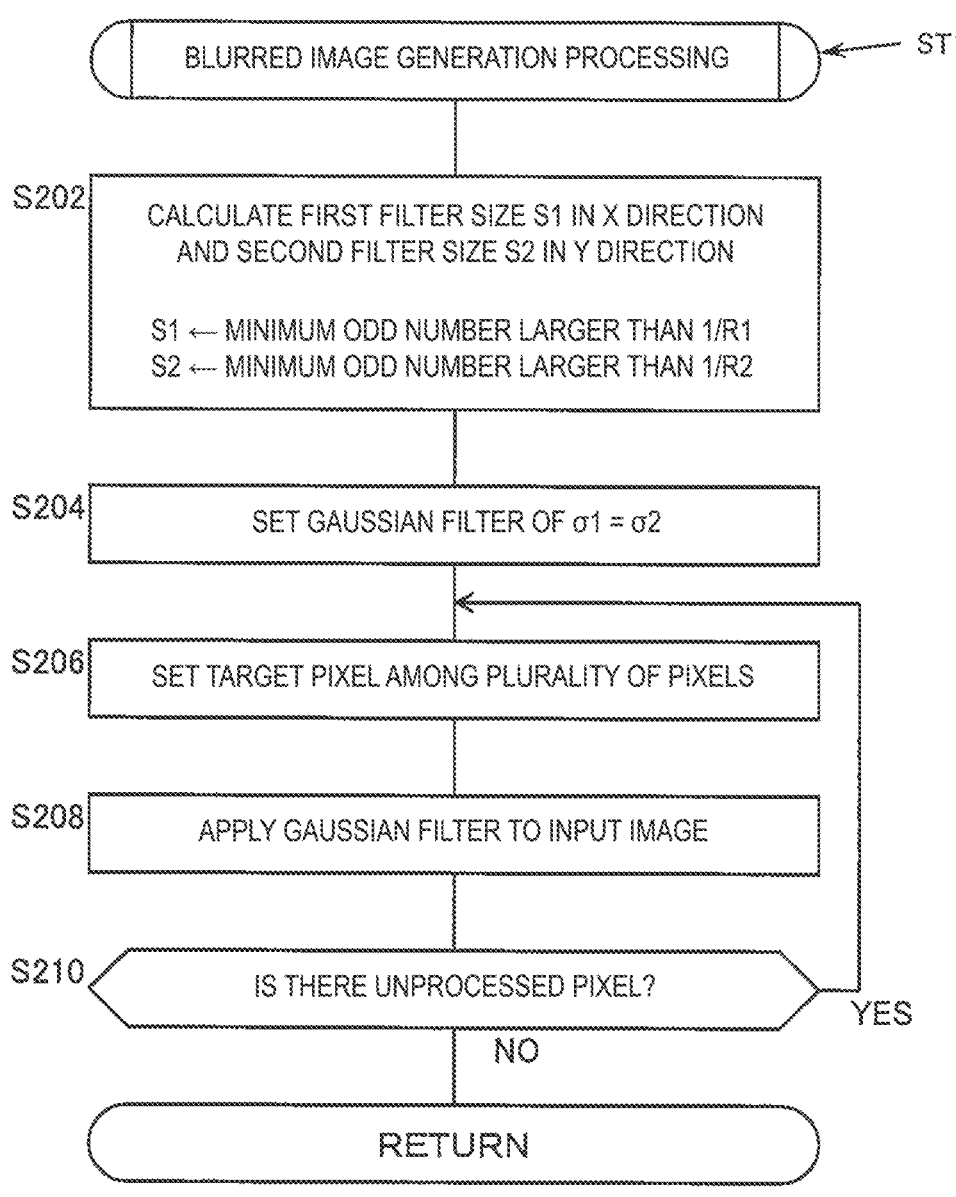
FIG. 11 is a flowchart schematically illustrating an example of blurred image generation processing.

As illustrated in FIG. 11, when the first conversion
magnification R1 is smaller than 1, the blurring processing
unit U1 may set the first filter size S1 of the Gaussian filter
F0 to an odd number larger than the reciprocal of the first
conversion magnification R1. When the second conversion
magnification R2 is smaller than 1, the blurring processing
unit U1 may set the second filter size S2 of the Gaussian
filter F0 to an odd number larger than the reciprocal of the
second conversion magnification R2. In this aspect, since
information of the pixels PX1 of the input image IM1 is not
lost at the time of image reduction, it is possible to obtain a
high-quality converted image.
Aspect 4

Incidentally, as illustrated in FIG. 1, a printing system
SY11 according to an aspect of the present technology
includes the image processing apparatus U0 described
above, a printing head 220 including a plurality of nozzles
and being capable of ejecting a liquid to a medium ME0, and
a control unit U10 that controls ejection of the liquid from
the printing head 220 so that a print image IM3 based on the
converted image IM2 is formed at the medium ME0.
According to this aspect, it is possible to provide a printing
system capable of acquiring a converted image in which thin
lines are appropriately connected when a conversion mag-
nification of a resolution is different between the first direc-
tion and the second direction.
Aspect 5

Figure 10:
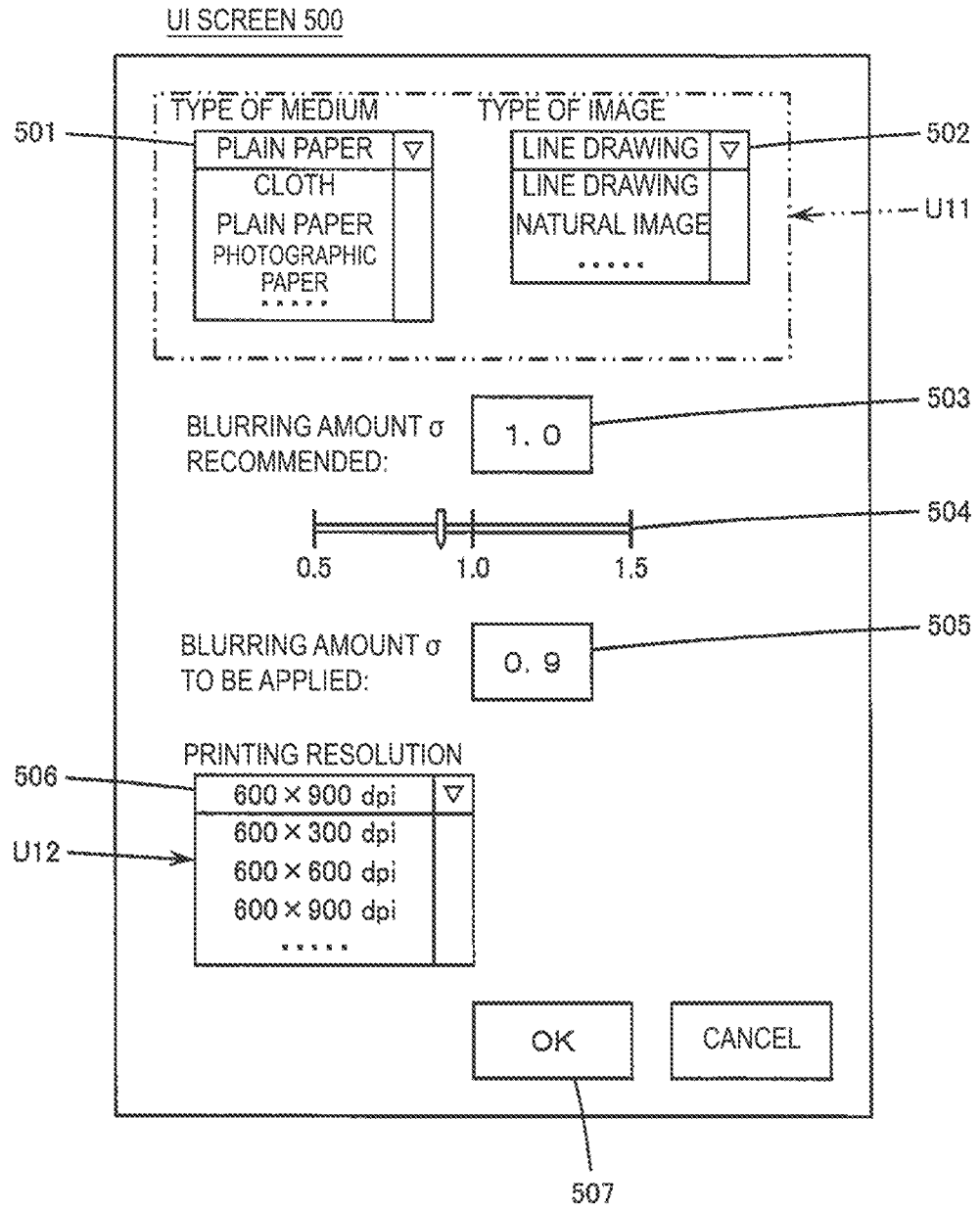
FIG. 10 is a diagram schematically illustrating an example of a user interface screen.

As illustrated in FIGS. 1 and 10, the printing system SY1
may further include a resolution receiving unit U12 that
receives a setting of the resolution of the converted image IM2 from among a plurality of different output resolutions RE under a printing condition C0 in which the resolution of the converted image IM2 can be set to be the plurality of output resolutions RE. As illustrated in FIG. 8, the output resolution RE may include a first output resolution RE1 and a second output resolution RE2 different from the first output resolution RE1. The blurring processing unit U1 may match the standard deviations σ1 and σ2 of the Gaussian filter F0 applied to the input image IM1 when the second output resolution RE2 is received by the resolution receiving unit U12 to the standard deviations ad and σ2 of the Gaussian filter F0 applied to the input image IM1 when the first output resolution RE1 is received by the resolution receiving unit. U12.

In the printing condition C0 in which the resolution of the converted image IM2 can be set to be the plurality of different resolutions RE, the standard deviations σ1 and σ2 of the Gaussian filter F0 do not change even when the resolution is the first output resolution RE1 or the second output resolution RE2.

In the printing condition C0, it is assumed that the resolution in the second direction D2 changes when the resolution in the first direction D1 does not change.

As illustrated in FIG. 2, when the Gaussian filter F0 having the first filter size S1 larger than the second filter size S2 is applied to the input image IM1 when the second conversion magnification R2 of the resolution in the second direction D2 is larger than the first conversion magnification R1 of the resolution in the first direction D1, the following effects are obtained.

Since the blurring range in the first direction D1 is wider than the blurring range in the second direction D2, the thickness of a thin line L2 in the second direction D2 is secured as illustrated in FIG. 7. In addition, since the blurring range in the second direction D2 is narrower than the blurring range in the first direction D1, excessive blurring does not occur in the second direction D2 in which a conversion magnification is relatively large. Further, since the standard deviation σ2 in the second direction D2 is equal to the standard deviation σ1 in the first direction D1 in the Gaussian filter F0, the blurring effect in the first direction D1 and the blurring effect the second direction D2 are appropriate, and a blurring effect in an oblique direction between the first direction D1 and the second direction D2 is also appropriate.

As illustrated in FIG. 3, when the Gaussian filter F0 having the first filter size S1 smaller than the second filter size S2 is applied to the input image IM1 when the second conversion magnification R2 of the resolution in the second direction D2 is smaller than the first conversion magnification R1 of the resolution in the first direction D1, the following effects are obtained.

Since the blurring range in the first direction D1 is narrower than the blurring range in the second direction D2, the thin lines L2 in the second direction D2 do not become excessively thick and are not excessively blurred in the first direction D1 in which a conversion magnification is relatively large. Thereby, the thin wire L2 in the second direction D2 does not become excessively thin. In addition, since the standard deviation σ2 in the second direction D2 is equal to the standard deviation σ1 in the first direction D1 in the Gaussian filter F0, the blurring effect in the first direction D1 and the blurring effect in the second direction D2 are appropriate, and a blurring effect in an oblique direction between the first direction D1 and the second direction D2 is also appropriate.

As described above, according to the above-described aspect, even when an output resolution changes under a set printing condition, widths of lines in a print image can be made uniform while an appropriate blurring effect is obtained.

Aspect 6

As illustrated in FIG. 10, the printing system SY1 may further include a printing condition receiving unit U11 that receives a setting of the printing condition C0 from a plurality of candidates. As illustrated in FIG. 8, the blurring processing unit U1 may apply the Gaussian filter F0 to the input image IM1 using standard deviations associated with the printing condition C0 among the standard deviations σi associated with the plurality of candidates as the standard deviations σ1 and σ2. In this aspect, it is possible to obtain a high-quality print image corresponding to a printing condition set from among the plurality of candidates.

Aspect 7

As illustrated in FIG. 8, the medium ME0 may include a first medium ME1 and a second medium ME2 through which the liquid is less likely to permeate than the first medium ME1. The plurality of candidates that can be the printing condition C0 may include a first medium candidate CM1 for forming the print image IM3 on the first medium ME1 and a second medium candidate CM2 for forming the print image IM3 on the second medium ME2. The blurring processing unit U1 may set the standard deviations σ1 and σ2 of the Gaussian filter F0 to be applied to the input image IM1 when the second medium candidate CM2 is received as the printing condition C0 to be larger than the standard deviations σ1 and σ2 of the Gaussian filter F0 to be applied to the input image IM1 when the first medium candidate CM1 is received as the printing condition C0. In this aspect, it is possible to obtain a high-quality print image corresponding to the type of medium.

Aspect 8

As illustrated in FIG. 8, the plurality of candidates that can be the printing condition C0 may include a first image candidate C11 that gives priority to sharpness of a line drawing included in the input image IM1, and a second image candidate C12 that gives priority to gradation of the input image IM1. The blurring processing unit U1 may set the standard deviations σ1 and σ2 of the Gaussian filter F0 to be applied to the input image IM1 when the second image candidate C12 is received as the printing condition C0 to be larger than the standard deviations σ1 and σ2 of the Gaussian filter F0 to be applied to the input image C11 when the first image candidate C11 is received as the printing condition C0. According to this aspect, it is possible to obtain a high-quality print image corresponding to the type of input image.

Aspect 9

As illustrated in FIG. 10, the blurring processing unit U1 may receive an operation of setting the standard deviation σ of the Gaussian filter F0 to be applied to the input image IM1 on a user interface screen 500. The blurring processing unit U1 may apply, to the input image IM1, the Gaussian filter F0 having the filter coefficient KE with the received standard deviation σ as the standard deviations σ1 and σ2. According to this aspect, it is possible to obtain a print image more preferred by a user.

Aspect 10

Further, according to an aspect of the present technology, there is provided an image processing method of acquiring a converted image IM2 of which the resolution is converted based on an input image IM1 including a plurality of pixels PX1 arranged in a first direction D1 and a second direction D2 intersecting the first direction D1, the image processing method including the following steps (A) and (B).

(A) a blurring processing step ST1 of applying a two-dimensional Gaussian filter F0 having a first filter size S1 in the first direction D1 and a second filter size S2 in the second direction D2 to the input image IM1 to generate a blurred image IM11.

(B) a resolution conversion step ST2 of generating, from the blurred image IM11, the converted image IM2 of which the resolution is converted at a first conversion magnification R1 that is a conversion magnification of the resolution in the first direction D1 and at a second conversion magnification R2 that is a conversion magnification of the resolution in the second direction D2.

Here, when the first filter size S1 is made larger than the second filter size S2 in the blurring processing step ST1, the second conversion magnification R2 is larger than the first conversion magnification R1. When the second filter size S2 is made larger than the first filter size S1 in the blurring processing step ST1, the first conversion magnification R1 is larger than the second conversion magnification R2. Further, a standard deviation σ of the Gaussian filter F0 in the first direction D1 is set to be a standard deviation σ1, and a standard deviation σ of the Gaussian filter F0 in the second direction D2 is set to be a standard deviation σ2. In this image processing method, in the blurring processing step ST1, when the second filter size S2 is different from the first filter size S1, the Gaussian filter F0 having a filter coefficient KE in which the standard deviation σ2 is equal to the standard deviation σ1 is applied to the input image IM1.

The above-described aspect can provide an image processing method capable of acquiring a converted image in which thin lines are appropriately connected when a conversion magnification of a resolution varies depending on a direction.

The present technology can be further applied to a composite device including the above-described image processing apparatus, a printing method for the above-described printing system, an image processing program for realizing the above-described image processing method in a computer, a printing control program for the above-described printing system, a computer-readable recording medium having any one of the above-described control programs recorded thereon, and the like. The above-described any one device may be constituted by a plurality of separate parts.

(2) SPECIFIC EXAMPLE OF CONFIGURATION OF PRINTING SYSTEM INCLUDING IMAGE PROCESSING APPARATUS

FIG. 1 schematically illustrates a configuration example of a printing system including an image processing apparatus. FIGS. 2 and 3 schematically illustrate an example in which a converted image is generated after performing blurring processing using a Gaussian filter.

The printing system SY1 illustrated in FIG. 1 includes a host device 100 and a printer 200, and is capable of forming the print image IM3 based on the converted image IM2 on the medium ME0. The host device 100 includes a CPU 111 that is a processor, a ROM 112, a RAM 113, a storage device 114, an input device 115, a display device 116, a communication I/F 117, and the like. Here, the CPU is an abbreviation for "Central Processing Unit", the ROM is an abbreviation for "Read Only Memory", the RAM is an abbreviation for "Random Access Memory", and the I/F is an abbreviation for "Interface". The above-described elements (111 to 117) are electrically coupled to each other so that information can be input and output therebetween. Note that the ROM 112, the RAM 113, and the storage device 114 are memories, and at least the ROM 112 and the RAM 113 are semiconductor memories.

The storage device 114 stores an OS which is not illustrated in the drawing, an image processing program PR0, the Gaussian filter F0 used for the blurring processing illustrated in FIGS. 2 and 3, a printing control program PR1, and the like. Here, the OS is an abbreviation for "Operating System". The storage device 114 may be a nonvolatile semiconductor memory such as a flash memory, a magnetic storage device such as a hard disk, or the like. The input device 115 may be a pointing device, a hard key including a keyboard, a touch panel attached to the surface of a display panel, or the like. The display device 116 displays a screen corresponding to display information based on the display information. The display device 116 may be a liquid crystal display panel or the like. The communication I/F 117 is connected to a communication I/F 230 of the printer 200 to input and output information such as print data to and from the printer 200. Communication through the communication I/Fs 117 and 230 may be wired or wireless and may be network communication such as through a LAN or the Internet. Here, LAN is an abbreviation for "Local Area Network".

The image processing program PR0 illustrated in FIG. 1 causes the host device 100 to realize a blurring processing function FU1 and a resolution conversion function FU2. The printing control program PR1 illustrated in FIG. 1 causes the host device 100 to realize a printing condition receiving function FU11, a resolution receiving function FU12, a color conversion function FU3, and a halftone processing function FU4.

The CPU 111 of the host device 100 performs various processing by appropriately reading information stored in the storage device 114 to the RAM 113 and executing the read program. The CPU 111 executes the programs (PR0, PR1) read to the RAM 113 to perform processing corresponding to the above-described functions (FU1 to FU4, FU11, FU12). The image processing program PR0 causes the host device 100, which is a computer, to function as the image processing apparatus U0 including the blurring processing unit U1 and the resolution conversion unit U2. The printing control program PR1 causes the host device 100 to function as the printing condition receiving unit U11, the resolution receiving unit U12, a color conversion unit U3, and a half-tone processing unit U4. In addition, the host device 100 executing the image processing program PR0 performs the blurring processing step ST1 and the resolution conversion step ST2 as illustrated in FIGS. 9 and 11. As illustrated in FIG. 9, the host device 100 executing the printing control program PR1 performs a printing condition receiving step ST11, a resolution receiving step ST12, a color conversion step ST3, and a halftone processing step ST4. The computer-readable recording medium, which stores the programs (PR0, PR1) causing the computer to realize the above-described functions (FU1 to FU4, FU11, FU12), is not limited to the storage device inside the host device, but may be a recording medium outside the host device.

Note that the host device 100 includes a computer such as a personal computer, a mobile phone such as a smart phone, a digital camera, a digital video camera, and the like. The host device 100 may include all components (111 to 117) in one housing but may be constituted by a plurality of devices separated from one another in such a manner that allows the devices to communicate with one another. In addition, the technology can be implemented even when at least a portion of the printer 200 is provided in the host device 100.

The printer 200 illustrated in FIG. 1 is assumed to be an ink jet printer that ejects a C ink, a M ink, a Y ink, and a K ink from the printing head 220 as color materials to form the print image IM3 corresponding to print data. Here, ink is an example of a liquid, C means cyan, M means magenta, Y means yellow, and K means black. Naturally, the printer 200 may be an electrophotographic printer such as a laser printer using a toner, a three-dimensional printer, or the like. The printing head 220 includes a plurality of nozzles Nc capable of ejecting C ink droplets onto the medium ME0, a plurality of nozzles Nm capable of ejecting M ink droplets onto the medium ME0, a plurality of nozzles Ny capable of ejecting Y ink droplets onto the medium ME0, and a plurality of nozzles Nk capable of ejecting K ink droplets onto the medium ME0. C, M, Y, and K inks are supplied to the printing head 220 from ink cartridges Cc, Cm, Cy, and Ck, respectively. Thereby, the printing head 220 ejects ink droplets 280 of C, M, Y, and K from the nozzles Nc, Nm, Ny, and Nk, respectively. When the ink droplets 280 land on the medium ME0, ink dots are formed at the medium ME0. As a result, printed matter having the print image IM3 on the medium ME0 is obtained.

The medium ME0 is not particularly limited and includes paper, fabric, resins, metals, and the like. The shape of the medium ME0 may be a roll shape, a cut two-dimensional shape, or a three-dimensional shape.

The printer 200 includes a controller 210 that controls ejection of ink from the printing head 220. The controller 210 constitutes a control unit U10 that controls ejection of ink from the printing head 220 so that the print image IM3 based on the converted image IM2 is formed at the medium ME0, together with the host device 100 that executes the printing control program PR1.

As illustrated in FIGS. 2 and 3, the input image IM1 has a plurality of pixels PX1 arranged in the X direction and the Y direction. The X direction and the Y direction are orthogonal to each other, but the X direction and the Y direction may not be orthogonal to each other as long as they intersect each other. In the example illustrated in FIGS. 2 and 3, the X direction corresponds to the first direction D1, and the Y direction corresponds to the second direction D2. It is also possible to make the Y direction correspond to the first direction D1 and make the X direction correspond to the second direction D2. In FIGS. 2 and 3, X1 pixels PX1 are arranged in the X direction, and Y1 pixels PX1 are arranged in the Y direction in the input image IM1 as a schematic example. When the color system of the input image IM1 is RGB, the pixel value of each pixel PX1 is a combination of an R value, a G value, and a B value. Here, R means red, G means green, and B means blue. The R value, the G value, and the B value are represented by, for example, gradation values of 0 to 255.

The blurring processing unit U1 included in the image processing apparatus U0 can generate the blurred image IM11 by applying a two-dimensional Gaussian filter F0 of S1×S2 to the input image IM1. The Gaussian filter F0 of S2×S1 means having a first filter size S1 in the X direction and a second filter size S2 in the Y direction. The first filter size S1 means the number of filter coefficients KE in the X direction, and the second filter size S2 means the number of filter coefficients KE in the Y direction. The filter coefficient KE is also referred to as a kernel. Note that the fact that the Gaussian filter F0 is two-dimensional means that there are a plurality of first filter sizes S1 and a plurality of second filter sizes S2. The blurring processing unit U1 sequentially sets a target pixel PX1t from among the plurality of pixels PX1, and applies the Gaussian filter F0 to the input image IM1 with the target pixel PX1t as a center to thereby generate the blurred image IM11.

Here, the standard deviation σ of the Gaussian filter F0 in the X direction is set as a standard deviation σ1, and the standard deviation σ of the Gaussian filter F0 in the Y direction is set as a standard deviation σ2. The Gaussian filter F0 illustrated in FIGS. 2 and 3 is characterized in that σ1=σ2 even when the filter sizes (S1, S2) are different from each other in the X direction and the Y direction.

The resolution conversion unit U2 included in the image processing apparatus U0 can generate a converted image IM2 of which the resolution is converted at a conversion magnification of R1×R2 from the blurred image IM11. The conversion magnification of R1×R2 means that the conversion magnification of the resolution in the X direction is the first conversion magnification R1 and the conversion magnification of the resolution in the Y direction is the second conversion magnification R2. Here, it is assumed that the input image IM1 has a resolution of RX1×RY1dpi and the converted image IM2 has a resolution of RX2×RY2 dpi. The resolution of the blurred image IM11 is RX1×RY1dpi. The first conversion magnification R1 is a ratio RX2/RX1 of a resolution RX2 of the converted image IM2 in the X direction to a resolution RX1 of the input image IM1 and the blurred image IM11 in the X direction, and is larger than 0. The second conversion magnification R2 is a ratio RY2/RY1 of a resolution RY2 of the converted image IM2 in the Y direction to a resolution RY1 of the input image IM1 and the blurred image IM11 in the Y direction, and is larger than 0.

In the schematic examples illustrated in FIGS. 2 and 3, each pixel included in the converted image IM2 will be referred to as a second pixel PX2. In the converted image IM2, X2 second pixels PX2 are arranged in the X direction, and Y2 second pixels PX2 are arranged in the Y direction. The first conversion magnification R1 in the X direction is also X2/X1, and the second conversion magnification R2 in the Y direction is also Y2/Y1.

In general, a standard deviation σ of the Gaussian filter used in blurring processing before resolution conversion increases as a conversion magnification decreases. A recommended value of the standard deviation σ for reducing aliasing (moire) is in a range from 1/(conversion magnification×π) to 3/(conversion magnification×π). Examples are given below.

When a conversion magnification is 0.75, the recommended value of the standard deviation σ is 0.42 to 1.27

When a conversion magnification is 0.50, the recommended value of the standard deviation σ is 0.64 to 1.91

When a conversion magnification is 0.25, the recommended value of the standard deviation σ is 1.27 to 3.82

The Gaussian filter F0 in this specific example is characterized in that the standard deviation satisfies σ1=σ2 regardless of the conversion magnification (R1, R2) on the assumption that the filter size (S1, S2) is separately set in the X direction and the Y direction with emphasis on maintaining the connection of the thin lines and the thickness of the thin lines in the converted image IM2. In addition, the Gaussian filter F0 in this specific example is characterized in that the standard deviation satisfies σ1=σ2 even when the conversion magnification (R1, R2) changes due to a change in the output resolution RE in the printing condition C0 in which the resolution of the converted image IM2 can be set to be a plurality of different output resolutions RE.

The blurring processing unit U1 may apply the Gaussian filter F0 to the input image IM1 only when R1<1 or R1<2.

R1<1 means that the image is reduced in the X direction and R2<1 means that the image is reduced in the Y direction. When blurring processing is not performed before the image is reduced in at least one of the X direction and the Y direction, a pixel PX1 with less information reflected in the resolution conversion is generated. Even when an interpolation operation referring to the plurality of pixels PX1 is performed during resolution conversion, the weight of the pixel value of the pixel PX1 far from the reference point corresponding to the second pixel PX2 included in the converted image IM2 is small. Consequently, the blurring processing unit U1 performs blurring processing when the image is reduced in at least one of the X direction and the Y direction. On the other hand, when the image is not reduced in both the X direction and the Y direction, information of all of the pixels PX1 is reflected in the resolution conversion even when the blurring processing is not performed before the resolution conversion. Consequently, the blurring processing unit U1 may not perform blurring processing when R1≥1 and R2≥1. When U2≥1 and R1≥1, the resolution conversion unit R2 may generate the converted image IM2 having the converted resolution from the input image IM1.

The resolution conversion unit U2 sequentially sets a target pixel PX2t from among the plurality of second pixels PX2 serving as the converted image IM2, and determines the pixel value of the target pixel PX2t by referring to the plurality of pixels PX1 based on the reference point corresponding to the target pixel PX2t. For example, the resolution conversion unit U2 determines the pixel value of the second pixel PX2 by performing an interpolation operation using the pixel values of the plurality of pixels PX1 within a predetermined range with respect to the reference point in the blurred image IM11 or the input image IM1. The reference point is set on the X-Y coordinate plane aligned with the blurred image IM11 or the input image IM1 to determine the pixel value of each second pixel PX2. For the interpolation operation, it is possible to use an interpolation operation according to a bicubic method in which a maximum of 4×4 pixels PX1 are referred to with a reference point as a reference. For a reference point outside the blurred image IM11 or the like among the 4×4 reference points based on the reference point, the pixel value is applied on the assumption that a pixel having the pixel value of the pixel PX1 positioned at an edge portion of the blurred image IM11 or the like is present outside the blurred image IM11 or the like. Naturally, the interpolation operation is not limited to the interpolation operation according to a bicubic method, and may be an interpolation operation according to a bilinear method in which a maximum of 2×2 pixels PX1 are referred to with a reference point as a reference.

The resolution of the print image IM3 formed by the printer 200 may be different between the X direction and the Y direction. Consequently, the resolution of the converted image IM2 for forming the print image IM3 may be different between the X direction and the Y direction. When the conversion magnification (R1, R2) of the resolution is different between the X direction and the Y direction, the thin lines included in the input image IM1 may be disconnected after the resolution is converted when blurring processing is not appropriately performed. When the resolution changes in a stepwise manner, the thicknesses of the thin lines included in the input image IM1 may change depending on the resolution when blurring processing is not appropriately performed.

Consequently, the blurring processing unit U1 does not limit the filter size of the Gaussian filter F0 to S1=S2, and sets the standard deviation of the Gaussian filter F0 to σ1=σ2 even when the filter size (S1, S2) is different between the X direction and the Y direction.

FIG. 2 schematically illustrates a state where a converted image IM2 in which a vertical conversion magnification (R2) is larger than a horizontal conversion magnification (R1) is generated after blurring processing using a horizontally long Gaussian filter F0 is performed. FIG. 3 schematically illustrates a state where a converted image IM2 in which a horizontal conversion magnification (R1) is larger than a vertical conversion magnification (R2) is generated after blurring processing using a vertically long Gaussian filter F0 is performed.

As illustrated in FIG. 2, when the blurring processing unit U1 sets the filter size to S1>S2, the second conversion magnification R2 is larger than the first conversion magnification R1. The reason for this expression is that when R2>R1, a relation of S1=S2 may be established depending on a conversion magnification. Naturally, when R2>R1, a relation of S1<S2 is not established, and a relation of S1>S2 may be established. As illustrated in FIG. 3, when the blurring processing unit U1 sets the filter size to S2>S1, the first conversion magnification R1 is larger than the second conversion magnification R2. The reason for this expression is that when R1>R2, a relation of S2=S1 may be established depending on a conversion magnification. Naturally, when R1>R2, a relation of S2<S1 is not established, and a relation of S2>S1 may be established. In any case, the blurring processing unit S1 applies the Gaussian filter F0 to the input image IM1, the Gaussian filter F0 having a filter coefficient KE in which the standard deviation σ2 is equal to the standard deviation σ1 when the second filter size U2 is different from the first filter size S1.

Figure 4:
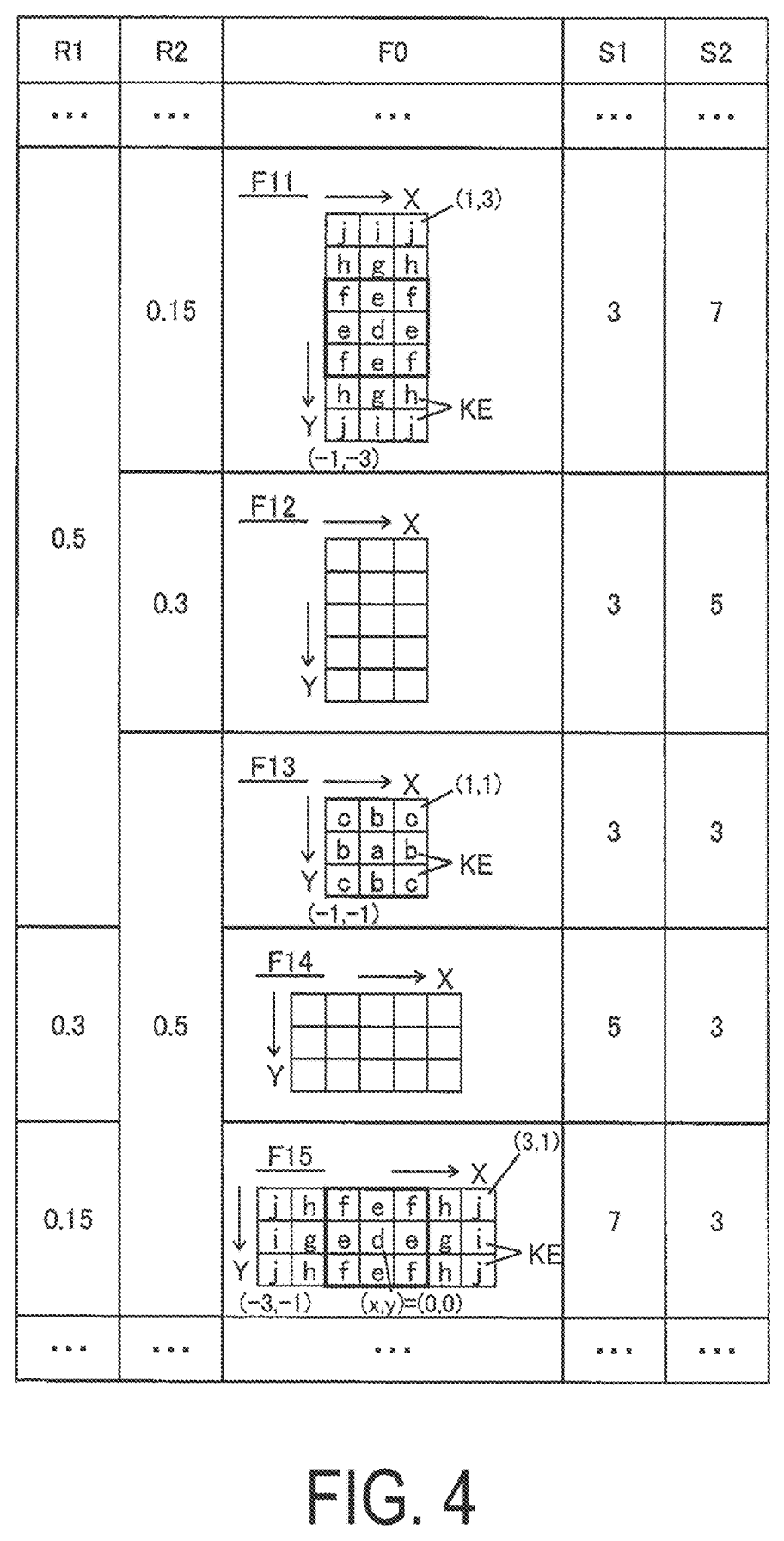

FIG. 4 schematically illustrates an example of a relationship between a conversion magnification (R1, R2) of a resolution and a filter size (S1, S2) of the Gaussian filter F0. Gaussian filters F11 to F15 illustrated in FIG. 4 are specific examples of the Gaussian filter F0. Filter coefficients a, b, and c are shown in the Gaussian filter F13 as filter coefficients KE, and filter coefficients d, e, f, g, h, I, and j are shown in the Gaussian filters F11 and F15 as filter coefficients KE.

In the Gaussian filter F0, it is assumed that the filter coefficients KE are arranged at equal intervals in both the X direction (D1) and the Y direction (D2). The coordinates (x, y) of each filter coefficient KE change by one in the X direction and change by one in the Y direction with the center of the Gaussian filter F0 as (0, 0). For example, the 7×3 Gaussian filter F15 has a filter coefficient KE in the range of coordinates (−3, −1) to (3, 1), and the 3×7 Gaussian filter F11 has a filter coefficient KE in the range of coordinates (−1, −3) to (1, 3).

In the Gaussian filter F0, when the standard deviation σ1 in the X direction and the standard deviation σ2 in the Y direction are both the standard deviation σ, a Gaussian distribution function indicating the weight of each filter coefficient KE is expressed by the following equation.

[Math. 1]

$$f(x, y) = \frac{1}{2\pi\sigma^2} \exp\left(-\frac{x^2 + y^2}{2\sigma^2}\right) \tag{1}$$

As will be described later in detail, the standard deviation σ is set in accordance with a printing condition C0 under which the resolution of the converted image IM2 can be set to a plurality of different output resolutions RE as illustrated in FIG. 8. Assuming that the standard deviation σ set under the set printing condition C0 is σi, a Gaussian distribution function under the set printing condition C0 is expressed by the following equation.

[Math. 2]

$$f(x, y) = \frac{1}{2\pi\sigma i^2} \exp\left(-\frac{x^2 + y^2}{2\sigma i^2}\right) \qquad (2)$$

Even when the output resolution RE changes under the set printing condition C0, the standard deviation σi is applied to the Gaussian distribution function.

According to the Gaussian distribution function, the filter coefficients a, b, and c of the 3×3 Gaussian filter F13 satisfy a relation of 0<c<b<a. The filter coefficients d, e, f, g, h, i, and j of the 7×3 Gaussian filter F15 and the 3×7 Gaussian filter F11 satisfy a relation of 0<j<i<h<g<f<e<d. When the standard deviation σ is the same in the Gaussian filter F11 and the Gaussian filter F15, a ratio of the filter coefficients f, e, and d of portions surrounded by thick lines in the Gaussian filters F11 and F15 is substantially equal to a ratio of the filter coefficients c, b, and a of the Gaussian filter F13.

$$f{:}e{:}d{\approx}c{:}b{:}a$$

The expression of "being substantially equal" is used because, even when the standard deviation σ for determining the filter coefficient KE is the same in the Gaussian filters F11 to F15, an error occurs when the filter coefficient KE is determined by calculation such as normalization or integerization from the Gaussian distribution function. Thus, the fact that a standard deviation σ of a certain Gaussian filter is equal to a standard deviation σ of another Gaussian filter having a different filter size is not limited to the fact that the standard deviations σ obtained from the filter coefficients KE are completely the same, but includes the fact that the standard deviations σ obtained from the filter coefficients KE are substantially the same. For example, when the filter coefficients a, b, and c of the Gaussian filter F13 and the filter coefficients d, e, f, g, h, i, and j of the Gaussian filters F11 and F15 are obtained from a certain standard deviation σ, it can be said that the standard deviations σ of these Gaussian filters are the same.

In addition, the Gaussian filters F11 to F15 have the same standard deviation σ1 in the X direction and the same standard deviation σ2 in the Y direction. σ1=σ2 means that the filter coefficients KE arranged in the X direction through the center of the Gaussian filter F0 and the filter coefficients KE arranged in the Y direction through the center of the Gaussian filter F0 are obtained from the standard deviation of σ=σ1=σ2. Thus, the fact that the standard deviation σ2 is equal to the standard deviation ad is not limited to the fact that the standard deviations σ1 and σ2 obtained from the filter coefficient KE are completely the same, but includes the fact that the standard deviations σ1 and σ2 obtained from the filter coefficient KE are substantially the same. This is because an error occurs when the standard deviation σ is set to σ1=σ2 and the filter coefficient KE is determined by calculation such as normalization or integerization from a Gaussian distribution function. For example, when filter coefficients i, g, e, d, e, g, and i arranged in the X direction and filter coefficients e, d, and e arranged in the Y direction are obtained from a certain standard deviation of σ=σ1=σ2 in the 7×3 Gaussian filter F15, it can be said that the standard deviation σ2 is equal to the standard deviation σ1.

The filter sizes (S1, S2) of the Gaussian filter F0 illustrated in FIG. 4 are set as follows.

When the first conversion magnification R1 in the X direction is smaller than 1, the first filter size S1 in the X direction is set to a minimum odd number larger than the reciprocal 1/R1 of the first conversion magnification. When the second conversion magnification R2 in the Y direction is smaller than 1, the second filter size S2 in the Y direction is set to a minimum odd number larger than the reciprocal 1/R2 of the second conversion magnification.

For example, when R1=0.5, since 1/R1=2, S1=3. When R1=0.3, since 1/R1=3.3, S1=5. When R1=0.15, since 1/R1=6.7, S1=7. Similarly, when R2=0.5, S2=3, when R2=0.3, S2=5, and when R2=0.15, S2=7.

FIG. 12 schematically illustrates the filter coefficients KE of the Gaussian filters F11 to F14 when σ=1 for reference. The sum of all the filter coefficients KE in each Gaussian filter F0 is 100%, and each filter coefficient KE is represented by a percentage to one decimal place. Although not illustrated in the drawing, the filter coefficients KE of the 7×3 Gaussian filter F15 are values obtained by rotating the filter coefficients KE of the 3×7 Gaussian filter F11 by 90°.

For example, the filter coefficients f:e:d=6 of the 3×7 Gaussian filter F11. 6%:10. 9%: 18. 0% means that the filter coefficients c:b:a=7 of the 3×3 Gaussian filter F13. 5%: 12. 4%: 20. This is approximately equal to 4%.

Figure 5:
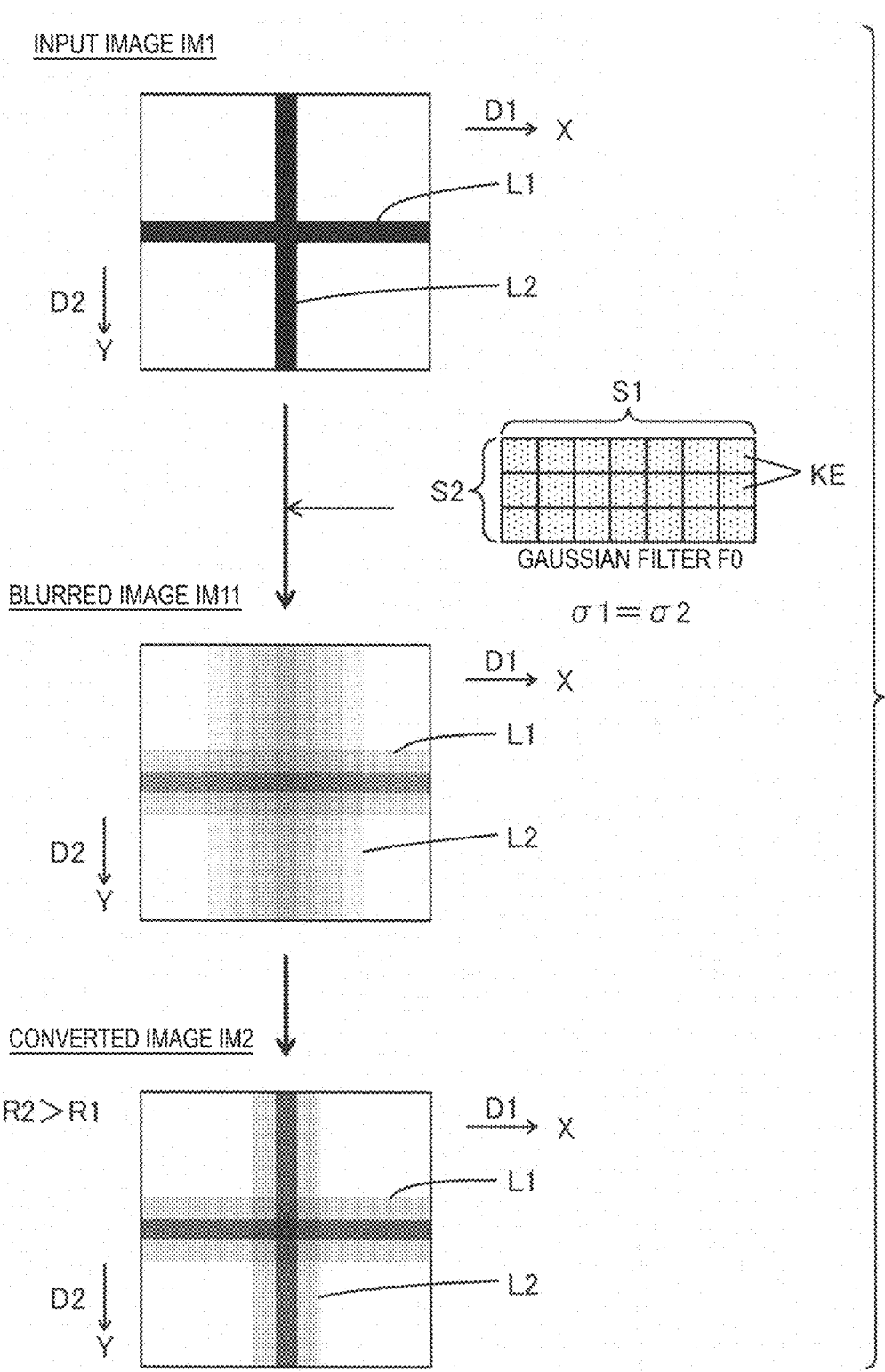
FIG. 5 is a diagram schematically illustrating an example of each image when a converted image in which a vertical conversion magnification is larger than a horizontal conversion magnification is generated after performing blurring processing using a horizontally long Gaussian filter.

FIG. 5 schematically illustrates the state of each image when a converted image IM2 in which a vertical conversion magnification (R2) is larger than a horizontal conversion magnification (R1) is generated after blurring processing using a horizontally long Gaussian filter F0 is performed. An input image IM1 includes thin lines L1 in the X direction (D1) and thin lines L2 in the Y direction (D2). These lines L1 and L2 have a color, such as black, which is darker than the surroundings and intersect each other in a cross shape.

When the filter size of the Gaussian filter F0 is S1>S2, a blurring range in the X direction is wider than a blurring range in the Y direction. In a blurred image IM11 obtained by applying the horizontally long Gaussian filter F0 to the input image IM1, the line L2 in the Y direction is thinner and wider than the line L1 in the X direction. When the resolution of the blurred image IM11 is converted at a conversion magnification of R2>R1, the thickness of the line L1 in the X direction and the thickness of the line L2 in the Y direction are aligned with each other.

Although not illustrated in the drawing, the same applies to a case where a converted image IM2 in which a horizontal conversion magnification (R1) is larger than a vertical conversion magnification (R2) is generated after blurring processing using a vertically long Gaussian filter F0 is performed. When the filter size of the Gaussian filter F0 is S2>S1, a blurring range in the Y direction is wider than a blurring range in the X direction. In the blurred image IM11 obtained by applying tlhe vertically long Gaussian filter F0 to the input image IM1.1, the line L1 in the X direction is thinner and wider than the line L2 in the Y direction. When the resolution of the blurred image IM11 is converted at a conversion magnification of R1>R2, the thickness of the line L1 in the X direction and the thickness of the line L2 in the Y direction are aligned with each other.

FIG. 6 schematically illustrates a converted image IM2 obtained by performing blurring processing using a vertically long Gaussian filter F0 on an input image IM1 having thin lines oriented closer to the Y direction (D2) than to the X direction (D1) and then converting a resolution. The thin lines included in the input image IM1 have a color, such as black, which is darker than the surroundings. Regarding the conversion magnification of the resolution, the vertical conversion magnification (R2) is smaller than the horizontal conversion magnification (R1). On the left side of FIG. 6, a converted image IM92 obtained by applying a 3×3 Gaussian filter to the input image IM1 described above and then performing resolution conversion of $0<R1<\frac{1}{3}$ (for example, R1=0.25) is illustrated.

An oblique line L90 included in the converted image IM92 is disconnected in the form of a dashed line. This is because most of information of some pixels PX1 included in the input image IM1 in the Y direction is lost during resolution conversion. Note that, when a Gaussian filter having a large filter size such as 7×7 is applied to the input image IM1 instead of a 3×3 Gaussian filter, a blurring range becomes too wide in the X direction and the input image IM1 is blurred too much, and the image quality of the converted image IM2 deteriorates.

On the other hand, oblique lines L0 included in the converted image IM2 are connected, the converted image being an image of which the resolution is converted after blurring processing using the 3×7 Gaussian filter F0 is performed. This is because a loss of information of the pixel IM1 included in the input image PX1 in the Y direction is suppressed at the time of the resolution conversion.

Although not illustrated in the drawing, the same applies to a case where the input image IM1 having thin lines oriented closer to the X direction (D1) than the Y direction (D2) is subjected to blurring processing using the horizontally long Gaussian filter F0 and then subjected to resolution conversion of R1<R2. The connection of the oblique lines L0 included in the obtained converted image IM2 is secured. This is because a loss of information of the pixel PX1 included in the input image IM1 in the X direction is suppressed at the time of the resolution conversion.

Figure 13:
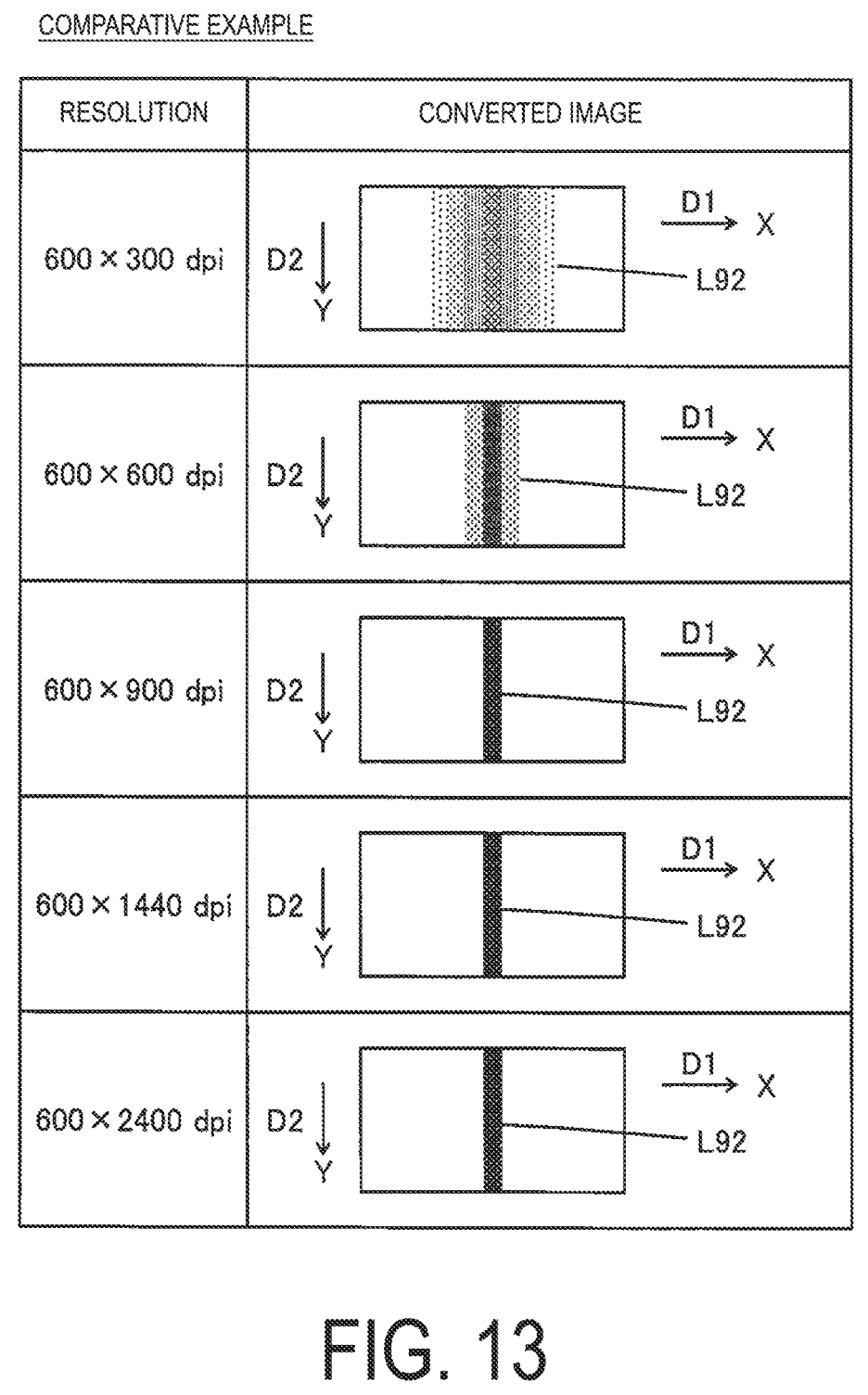

FIG. 7 schematically illustrates a converted image IM2 obtained by performing blurring processing. In the blurring processing, a Gaussian filter F0 of S1×S2 having a standard deviation of σ1=σ2 not changing in spite of a change in a resolution in the Y direction is applied to the input image IM1. FIG. 13 schematically illustrates a converted image IM2 obtained by performing blurring processing as a comparative example. In the blurring processing, a square-shaped Gaussian filter having a standard deviation σ increasing as a resolution decreases is applied to an input image IM1 in accordance with a general recommended value. Note that the input image IM1 includes thin lines in the Y direction (D2). The vertical thin lines included in the input image IM1 have a color, such as black, which is darker than the surroundings.

In the comparative example illustrated in FIG. 13, when a resolution in the Y direction is equal to or less than a resolution in the X direction, a vertical line L92 becomes thinner and thicker as the resolution in the Y direction becomes lower. On the other hand, as illustrated in FIG. 7, when a Gaussian filter F0 of S1×S2 having a standard deviation of σ1=σ2 not changing in spite of a change in a resolution in the Y direction is used, the thickness of the line L2 does not substantially change and the density of the line L2 does not substantially change even when the resolution in the Y direction is changed. Although not illustrated in the drawing, when a Gaussian filter F0 of S1×S2 having a standard deviation of σ1=σ2 not changing in spite of a change in a resolution in the X direction is used, the thickness of a line in the X direction does not substantially change and the density of the line does not substantially change.

Note that, as a smoothing filter, a moving average filter having all the same filter coefficients is known. The fact that all of the filter coefficients are the same means that not only filter coefficients at coordinates shifted by one in the X direction and the Y direction from the center of the moving average filter but also, for example, filter coefficients obliquely shifted at a distance of $2^{1/2}\approx1.4$ from the center of the moving average filter, and the like have the same value. For this reason, when the moving average filter is applied to the input image IM1, an oblique component is excessively emphasized, and the image quality of the converted image IM2 is deteriorated.

In the Gaussian filter F0 described above, the standard deviation σ2 in the Y direction (D2) is equal to the standard deviation σ1 in the X direction (D1), and thus the blurring effects in the X direction and the Y direction are appropriate, and a blurring effect in an oblique direction between the X direction and the Y direction is also appropriate.

As illustrated in FIG. 8, the standard deviations σ1 and σ2 of the Gaussian filter F0 are set in accordance with a printing condition C0 in which the resolution of the converted image IM2 can be set to a plurality of different output resolutions RE. FIG. 8 schematically illustrates standard deviations σi associated with respective printing conditions C0. The standard deviations σi illustrated in FIG. 8 are merely examples, and the standard deviations σi associated with the respective printing conditions C0 can be changed as appropriate.

When the printing condition C0 is set, the Gaussian filter F0 is applied to the input image IM1 using the standard deviation σi associated with the printing condition C0 or a standard deviation adjusted from σi as standard deviations ad and σ2.

The standard deviation σi illustrated in FIG. 8 is provided in accordance with the type of medium ME0 or input image IM1. It can be said that FIG. 8 illustrates a plurality of candidates that can be the printing condition C0.

In terms of the medium ME0, the plurality of candidates illustrated in FIG. 8 include cloth, plain paper, and photographic paper. Cloth is associated with a standard deviation σi of 0.5, plain paper is associated with a standard deviation σi of 1.5, and photographic paper is associated with a standard deviation σi of 2.0. Assuming that the standard deviation σi of photographic paper is 2.0 as a default, the standard deviation σi of the plain paper is set to 1.5, which is slightly small, because the plain paper is more likely to be permeated than the photographic paper and required to form a slightly sharper image. Since cloth is more likely to be permeated than plain paper and required to form a sharper image, the standard deviation σi is 0.5, which is further reduced.

For example, when the plain paper corresponds to the first medium ME1, the photographic paper corresponds to the second medium ME2 because ink is less likely to permeate through the photographic paper than through the plain paper. In this case, the plain paper corresponds to the first medium candidate CM1 for forming the print image IM3 on the first medium ME1, and the photographic paper corresponds to the second medium candidate CM2 for forming the print image IM3 on the second medium ME2. Note that, when cloth corresponds to the first medium ME1, plain paper or photographic paper corresponds to the second medium ME2.

From the viewpoint of the input image IM1, the plurality of candidates illustrated in FIG. 8 include a "line drawing"

and a "natural image and graphics". The "line drawing" is associated with a standard deviation oi of 1.0, and the "natural image and graphics" is associated with a standard deviation σi of 2.0. The "line drawing" has a standard deviation σi of 1.0, which is small, because the sharpness of the line drawing is prioritized over the "natural image and graphics". The "natural image and graphics" has a large standard deviation σi of 2.0 in order to balance smoothness and sharpness of gradation.

As described above, the "line drawing" corresponds to the first image candidate C11 that gives priority to the sharpness of the line drawing included in the input image IM1, and the "natural image and graphics" corresponds to the second image candidate C12 that gives priority to the gradation of the input image IM1.

In any of the printing conditions C0 illustrated in FIG. 8, the output resolution RE can be changed to 600×300 dpi, 600×600 dpi, 600×900 dpi, Even when the output resolution RE is changed, the standard deviation of σ1=σ2=σi applied to the Gaussian filter F0 do not change. For example, when "line drawing" is set as a printing condition C0 and a standard deviation σi of 1.0 is applied to the Gaussian filter F0, the applied standard deviation oi of 1.0 does not change even when the output resolution RE is changed to 600×300 dpi, 600×600 dpi, 600×900 dpi, Here, among 600×300 dpi, 600×600 dpi, 600×900 dpi, a plurality of different output resolutions are set to be the first output resolution RE1 and the second output resolution RE2. As illustrated in FIG. 8, when 600×300 dpi corresponds to the first output resolution RE1, any one of 600×600 dpi, 600×900 dpi, corresponds to the second output resolution RE2. FIG. 8 shows that 600× 900 dpi corresponds to the second output resolution RE2.

(3) SPECIFIC EXAMPLE OF PRINTING CONTROL PROCESSING

FIG. 9 schematically illustrates printing control processing in which a print image IM3 corresponding to a converted image IM2 of which the resolution is converted based on the input image IM1 is formed by the printer 200. FIG. 10 schematically illustrates the UI screen 500 displayed in step S102 of the printing control processing. Here, UI is an abbreviation for "user interface". FIG. 11 schematically illustrates blurred image generation processing performed in step S110 of the printing control processing. Hereinafter, the printing control processing will be described with reference to FIGS. 1 to 8.

The printing control processing in this specific example is performed by the host device 100 illustrated in FIG. 1. The printing control processing is started when the host device 100 receives a user operation for causing the printer 200 to form the print image IM3 by the input device 115. Here, steps S102 to S104 correspond to the printing condition receiving step ST11, the resolution receiving step ST12, the printing condition receiving unit U11, the resolution receiving unit U12, the printing condition receiving function FU12, and the resolution receiving function FU12. Steps S104 and S108 to S110 correspond to the blurring processing step ST1, the blurring processing unit U1, and the blurring processing function FU1. Steps S106 and S112 correspond to the resolution conversion step ST2, the resolution conversion unit U2, and the resolution conversion function FU2. Step S114 corresponds to the color conversion step ST3, the color conversion unit U3, and the color conversion function FU3. Step S116 corresponds to the halftone processing step ST4, the halftone processing unit U4, and the halftone processing function FU4. In the following description, the term "step" is omitted, and a reference numeral corresponding to a step may be written in parentheses.

When the printing control processing is started, the host device 100 displays the UI screen 500 illustrated in FIG. 10 on the display device 116 (S102). The UI screen 500 includes a medium type selection field 501, an image type selection field 502, a recommended standard deviation display field 503, a standard deviation adjustment region 504, a standard deviation input field 505, a resolution selection field 506, an OK button 507, and the like.

In the medium type selection field 501 indicated as "type of medium", the host device 100 receives a setting for any one type among medium candidates such as cloth, plain paper, and photographic paper. A user can select any one type from the plurality of medium candidates by operating the medium type selection field 501 with the input device 115. In the image type selection field 502 indicated as "type of image", the host device 100 receives a setting for any one type among image candidates such as a line drawing and a natural image. The user can select any one type from among the plurality of image candidates by operating the image type selection field 502 with the input device 115. The medium type selection field 501 and the image type selection field 502 correspond to the printing condition receiving unit U11 that receives a setting for the printing condition C0 among a plurality of candidates. A combination of the selected medium candidate and the selected image candidate corresponds to the set printing condition C0. For example, the host device 100 displays a smaller standard deviation σi out of the standard deviation σi associated with the selected medium candidate and the standard deviation oi associated with the selected image candidate in the recommended standard deviation display field 503 and the standard deviation input field 505. In the UI screen 500, the standard deviation σ is indicated as "blurring amount". In the example illustrated in FIG. 8, a standard deviation σi of 1.5 is associated with the plain paper, and a standard deviation σi of 1.0 is associated with the line drawing. Thus, when plain paper and the line drawing are selected, a standard deviation σi of 1.0 is displayed in the recommended standard deviation display field 503 and the standard deviation input field 505.

The standard deviation adjustment region 504 illustrated in FIG. 10 has a slider control constituted by a horizontal slider bar and a slider. In the standard deviation adjustment region 504, the host device 100 increases or decreases the standard deviation σ to be applied to the Gaussian filter F0 from the recommended standard deviation σi by receiving an operation of the slider by the input device 115. The host device 100 displays the standard deviation σ corresponding to the position of the slider in the standard deviation input field 505. In the standard deviation input field 505, the host device 100 receives an input of the standard deviation σ to be applied to the Gaussian filter F0 by the input device 115.

As described above, the host device 100 receives an operation of setting the standard deviation σ of the Gaussian filter F0 to be applied to the input image IM1 on the UI screen 500.

In the resolution selection field 506 indicated as "printing resolution", the host device 100 receives a setting for the output resolution among the output resolutions RE such as 600×300 dpi, 600×600 dpi, and 600×900 dpi. The user can select any one output resolution from among the plurality of output resolutions RE by operating the resolution selection field 506 with the input device 115. The resolution selection field 506 corresponds to the resolution receiving unit U12 that receives a setting for the resolution of the converted image IM2 among the plurality of output resolutions RE in the printing condition C0 in which the resolution of the converted image IM2 can be set to a plurality of different output resolutions RE.

When an operation of the OK button 507 is received by the input device 115, the host device 100 acquires the set printing condition C0, the set output resolution, and the set standard deviation σ, and holds them in at least one of the RAM 113 and the storage device 114 (S104 in FIG. 9). The printing condition C0 is a combination of the medium ME0 set in the medium type selection field 501 and the image set in the image type selection field 502.

Next, the host device 100 calculates the first conversion magnification R1=RX2/RX1 in the X direction and the second conversion magnification R2=RY2/RY1 in the Y direction, based on the resolutions RX1, RY1, RX2, and RY2 (see FIGS. 2 and 3) before and after the resolution conversion (S106).

After the conversion magnifications (R1, R2) are calculated, the host device 100 determines whether R1<1 or R2<1 (S108). When R1<1 or R2<1, the host device 100 performs the blurred image generation processing illustrated in FIG. 11 (S110) and then causes the processing to proceed to S112. Thus, the blurring processing unit U1 generates the blurred image IM11 when at least one of the conversion magnifications (R1, R2) is smaller than 1. When R1 1 and R2 1, the host device 100 causes the processing to proceed to S112 without performing the blurred image generation processing. Thus, when the conversion magnifications (R1, R2) are both 1 or more, the resolution conversion unit U2 generates the converted image IM2 of which the resolution is converted at the conversion magnifications (R1, R2) from the input image IM1.

When the blurred image generation processing illustrated in FIG. 11 is started, the host device 100 calculates the first filter size S1 in the X direction and the second filter size S2 in the Y direction (refer to FIGS. 2 and 3) (S202). When R1<1, the host device 100 sets the first filter size S1 to a minimum odd number larger than the reciprocal 1/R1 of the first conversion magnification. When R2<1, the host device 100 sets the second filter size S2 to a minimum odd number larger than the reciprocal 1/R2 of the second conversion magnification. As illustrated in FIG. 4, the filter sizes (S1, S2) are set separately in the X direction and the Y direction.

Here, when the filter size is S1>S2 as illustrated in FIG. 2, the Gaussian filter F0 is applied to the input image IM1 in which the conversion magnification from the blurred image IM11 to the converted image IM2 is R2>R1. When the filter size is S2>S1 as illustrated in FIG. 3, the Gaussian filter F0 is applied to the input image IM1 in which the conversion magnification from the blurred image IM11 to the converted image IM2 is R1>R2.

After the filter sizes (S1, S2) are calculated, the host device 100 sets the Gaussian filter F0 having the filter coefficient KE with the standard deviation σ received on the UI screen 500 as the standard deviations σ1 and σ2 (σ1=σ2) (S204). When the Gaussian filter F0 is generated, the host device 100 calculates the value of the Gaussian distribution function f(x, y) according to the filter sizes (S1, S2) in accordance with the above-described Equation (1) and normalizes the obtained values to calculate the filter coefficients KE. When the standard deviation σi associated with the printing condition C0 is set as illustrated in FIG. 8, the host device 100 may calculate the value of the Gaussian distribution function f(x, y) according to the filter sizes (S1, S2) in accordance with the above-described Equation (2).

In addition, the host device 100 may store a plurality of different Gaussian filters F0 according to the standard deviation of σ=σ1=σ2 in the storage device 114 in advance, and may select a Gaussian filter to which the standard deviation σ received on the UI screen 500 is applied from among the plurality of Gaussian filters F0.

Thereafter, the host device 100 sets the target pixel PX1t among the plurality of pixels PX1 serving as the blurred image IM11 (S206). This processing can be processing for setting the coordinates of the target pixel PX1t in the X-Y coordinate plane adjusted to the blurred image IM11.

Next, the host device 100 performs a filter operation in which the Gaussian filter F0 is applied to the input image IM1 with the target pixel PX1t as the center (S208). Note that, when the color system of the input image IM1 is RGB, the pixel value of each pixel PX1 is a combination of an R value, a G value, and a B value.

Here, S1×S2 filter coefficients KE included in the Gaussian filter F0 are assumed to be Kt, and the pixel value of the pixel PX1 to be matched to the filter coefficient Kt in the input image IM1 is assumed to be Pt. Assuming that the pixel value of the pixel PX1 in the blurred image IM11 is Q, a filter operation is performed in accordance with the following equation.

[Math. 3]

$$Q = \sum_{t=1}^{S1 \times S2} Kt \times Pt \tag{3}$$

For filter coefficients outside the input image IM1 among the S1×S2 filter coefficients Kt centered on the target pixel PX1t, a pixel value of a pixel PX1 positioned at the edge of the input image IM1 is applied assuming that the pixel is outside the input image IM1. When the color system of the input image IM1 is RGB, the host device 100 calculates a pixel value Q for each of the R value, the G value, and the B value.

After the pixel value Q is calculated, the host device 100 branches the processing in accordance with whether there is an unprocessed pixel PX1 for which the pixel value Q has not been calculated (S210). When there is an unprocessed pixel PX1, the host device 100 repeats the processing from S206 to S210. Thereby, the pixel values Q are calculated for all of the pixels PX1 constituting the blurred image IM11. When the blurred image IM11 having the pixel value Q in all of the pixels PX1 is generated, the host device 100 terminates the blurred image generation processing.

As described above, the blurring processing unit U1 applies the Gaussian filter F0 having the filter coefficient KE to the input image IM1, the filter coefficient KE being a filter coefficient in which the standard deviation σ2 is equal to the standard deviation ad even when the filter sizes (S1, S2) are different in the X direction and the Y direction. The standard deviation of σ=σ1=σ2 of the Gaussian filter F0 is a standard deviation set on the UI screen 500 illustrated in FIG. 10. When the standard deviation σi associated with the printing condition C0 is set as illustrated in FIG. 8, the blurring processing unit U1 applies the Gaussian filter F0 to the input image IM1 using the standard deviation σi associated with the printing condition C0 as the standard deviations σ1 and σ2.

In addition, on the UI screen 500 illustrated in FIG. 10, when the printing condition C0 does not change, the standard deviation σ applied to the Gaussian filter F0 does not change even when the output resolution is changed in the resolution selection field 506. Referring to FIG. 8, the blurring processing unit U1 matches the standard deviations σ1 and σ2 of the Gaussian filter F0 applied to the input image IM1 when the second output resolution RE2 is received to the standard deviations σ1 and σ2 of the Gaussian filter F0 applied to the input image IM1 when the first output resolution RE1 is received. When the standard deviation σi associated with the type of medium ME0 is set as illustrated in FIG. 8, the blurring processing unit U1 sets the standard deviations σ1 and σ2 of the Gaussian filter F0 applied to the input image IM1 when the second medium candidate CM2 is received to be larger than the standard deviations σ1 and σ2 of the Gaussian filter F0 applied to the input image IM1 when the first medium candidate CM1 is received. When the standard deviation σi associated with the type of input image IM1 is set as illustrated in FIG. 8, the blurring processing unit U1 sets the standard deviations σ1 and σ2 of the Gaussian filter F0 applied to the input image IM1 when the second image candidate C12 is received to be larger than the standard deviations σ1 and σ2 of the Gaussian filter F0 applied to the input image IM1 when the first image candidate C11 is received.

After the blurred image generation processing is terminated, the host device 100 performs resolution conversion processing for generating, from the blurred image IM11, the converted image IM2 of which the resolution is converted so that the conversion magnifications (R1, R2) calculated in S106 of FIG. 9 are set (S112 of FIG. 9). Note that, since an edge of a line or the like included in the input image IM1 is weakened by the blurred image generation processing, the host device 100 may perform sharpening processing for emphasizing the edge between S110 and S112 depending on the type of input image IM1. When the blurred image generation processing of S110 is not performed, the host device 100 performs resolution conversion processing in S112, the resolution conversion processing being processing for generating, from the input image IM1, the converted image IM2 of which the resolution is converted so that the conversion magnifications (R1, R2) calculated in S106 are set. The host device 100 can generate the converted image IM2 from the blurred image IM11 or the input image IM1 by an interpolation operation or the like using a bicubic method in which a maximum of 4×4 pixels PX1 are referred to with a reference point as a reference.

After the converted image IM2 is generated, the host device 100 performs color conversion processing for converting the converted image IM2 into ink amount data having integer values of, for example, $2^8$ gradations of C, M, Y, and K (S114). For example, the color conversion processing in S114 can be processing for converting R, G, and B values of each second pixel PX2 into ink amount data with reference to a color conversion look-up table in which a correspondence relationship between gradation values of R, G, and B and gradation values of C, M, Y, and K is specified.

Subsequently, the host device 100 performs predetermined halftone processing on gradation values of pixels constituting the ink amount data to reduce the number of gradations of the gradation values and generate halftone data (S116). As the halftone processing, halftone processing according to a dither method, halftone processing according to an error diffusion method, halftone processing according to a density pattern method, or the like can be used. Halftone data may be binary data indicating the state of formation of dots in units of pixels and whether dots have been formed, or may be multivalued data for three gradations or more capable of dealing with dots of different sizes such as small, medium, and large dots.

Thereafter, the host device 100 transmits the halftone date to the printer 200 to cause the printer 200 to form the print image IM3 based on the converted image IM2 (S118) and terminates the printing control processing. The printer 200 having received the halftone data ejects ink droplets from the printing head 220 so that the print image IM3 is formed at the medium ME0 based on the halftone data.

As described above, the control unit U10 including the color conversion unit U3 and the halftone processing unit U4 controls the ejection of ink from the printing head 220 so that the print image IM3 based on the converted image IM2 is formed at the medium ME0.

Note that, when the printer 200 can execute the halftone processing, the host device 100 may transmit the ink amount data to the printer 200, and the printer 200 having received the ink amount data may perform the halftone processing. When the printer 200 can also execute color conversion processing, the host device 100 may transmit the converted image IM2 to the printer 200, and the printer 200 having received the converted image IM2 may perform the color conversion processing.

When the above-described printing control processing is performed, the print image IM3 based on the converted image IM2 in which thin lines are appropriately connected is formed when the conversion magnifications (R1, R2) of the resolutions are different from each other in the X direction and the Y direction. In addition, even when the output resolution RE changes under the set printing condition C0, the line width of the print image IM3 can be made uniform while obtaining an appropriate blurring effect.

As illustrated in FIG. 2, when the Gaussian filter F0 having a filter size of S1>S2 is applied to the input image IM1 when the conversion magnification is R2>R1, the following effects can be obtained.

Since a blurring range in the X direction is wider than a blurring range in the Y direction, connection of the thin lines L0 oriented closer to the X direction than to the Y direction is secured. In addition, since the blurring range in the Y direction is narrower than the blurring range in the X direction, excessive blurring does not occur in the Y direction. Further, since the standard deviation σ2 in the Y direction is equal to the standard deviation σ1 in the X direction in the Gaussian filter F0, blurring effects in the X direction and the Y direction are appropriate, and a blurring effect in an oblique direction between the X direction and the Y direction is also appropriate. When a resolution in the Y direction does not change and a resolution in the X direction changes under the set printing condition C0, a blurring range in the Y direction is constant regardless of the resolution in the X direction, and thus the thickness of the thin line L2 in the X direction is secured.

As illustrated in FIG. 3, when the Gaussian filter F0 having a filter size of S2>S1 is applied to the input image IM1 when the conversion magnification is R1>R2, the following effects can be obtained.

Since a blurring range in the Y direction is wider than a blurring range in the X direction, connection of thin lines oriented closer to the Y direction than to the X direction is secured as illustrated in FIG. 6. In addition, since the blurring range in the X direction is narrower than the blurring range in the Y direction, excessive blurring does not occur in the X direction. Further, since the standard deviation σ1 in the X direction is equal to the standard deviation σ2 in the Y direction in the Gaussian filter F0, blurring effects in the Y direction and the X direction are appropriate, and a blurring effect in an oblique direction between the Y direction and the X direction is also appropriate. When a resolution in the X direction does not change and a resolution in the Y direction changes under the set printing condition C0, a blurring range in the X direction is narrower than a blurring range in the Y direction, and thus the thin lines L2 in the Y direction do not become excessively thick and are not excessively blurred in the X direction as illustrated in FIG. 7. Thereby, the thin lines L2 in the Y direction do not become excessively thin.

Similar effects can also be obtained when a resolution in the Y direction does not change and a resolution in the X direction changes under the set printing condition C0.

(4) MODIFICATION EXAMPLE

Various modification examples of the present disclosure are conceivable.

For example, the blurring processing unit U1 and the resolution conversion unit U2 may be provided in the printer 200. Thus, printing control processing illustrated in FIG. 9 may be performed by the printer 200.

The entity that performs the printing control processing is not limited to the CPU, and may be an electronic component other than the CPU, such as an ASIC. Here, the ASIC is an abbreviation for "Application Specific Integrated Circuit". Naturally, a plurality of CPUs may perform the printing control processing in cooperation, or a CPU and another electronic component (for example, an ASIC) may perform the printing control processing in cooperation.

The color system of the input image IM1 is not limited to RGB, and may be CMY, CMYK, or the like. The color systems of the blurred image IM11 and the converted image IM2 are matched to the color system of the input image IM1.

The above-described processes can be appropriately changed, for example, reordered. For example, the determination processing of S108 may be eliminated from the printing control processing illustrated in FIG. 9, and the image processing apparatus U0 may perform the blurred image generation processing of S110 even when R1 1 and R2 1.

The filter size (S1, S2) of the Gaussian filter F0 is not limited to the calculated value illustrated in S202 in FIG. 11. For example, the first filter size S1 in the X direction may be a number larger than a minimum odd number larger than the reciprocal 1/R1 of the first conversion magnification, such as a number obtained by adding 2 to the minimum odd number larger than the reciprocal 1/R1 of the first conversion magnification. The second filter size S2 in the Y direction may be a number larger than a minimum odd number larger than the reciprocal 1/R2 of the second conversion magnification, such as a number obtained by adding 2 to the minimum odd number larger than the reciprocal 1/R2 of the second conversion magnification.

In the UI screen 500 illustrated in FIG. 10, at least some of the recommended standard deviation display field 503, the standard deviation adjustment region 504, and the standard deviation input field 505 may be omitted. By applying the standard deviation σi associated with the set printing condition C0 to the Gaussian filter F0 as the standard deviations σ1 and σ2, it is possible to obtain an effect of obtaining a high-quality print image corresponding to the printing condition C0.

Note that, when the standard deviations (σ1, σ2) of the Gaussian filter F0 are the same in the X direction and the Y direction when the filter sizes (S1, S2) are different in the X direction and the Y direction, it is possible to obtain a basic effect that a converted image in which thin lines are appropriately connected when a conversion magnification of a resolution varies depending on a direction can be acquired. This basic effect is obtained also when standard deviations G different depending on an output resolution are applied to a Gaussian filter.

(5) CONCLUSION

As described above, according to various aspects of the present disclosure, it is possible to provide technology or the like capable of acquiring a converted image in which thin lines are appropriately connected when a conversion magnification of a resolution varies depending on a direction. Naturally, even technology including only the components recited in the independent claims produces the above-described basic actions and effects.

Furthermore, the aspects of the present disclosure can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the present disclosure include these configurations and the like.

What is claimed is:

1. An image processing apparatus configured to execute image processing for acquiring a converted image of which a resolution is converted based on an input image including a plurality of pixels arranged in a first direction and in a second direction intersecting the first direction, the image processing apparatus comprising:

a blurring processing unit configured to generate a blurred image by applying, to the input image, a two-dimensional Gaussian filter having a first filter size in the first direction and a second filter size in the second direction; and a resolution conversion unit configured to generate, from the blurred image, the converted image of which the resolution is converted at a first conversion magnification that is a conversion magnification of the resolution in the first direction and at a second conversion magnification that is a conversion magnification of the resolution in the second direction, wherein the second conversion magnification is larger than the first conversion magnification when the blurring processing unit makes the first filter size larger than the second filter size, the first conversion magnification is larger than the second conversion magnification when the blurring processing unit makes the second filter size larger than the first filter size, a standard deviation σ of the Gaussian filter in the first direction is set to be a standard deviation σ1, a standard deviation σ of the Gaussian filter in the second direction is set to be a standard deviation σ2, and the blurring processing unit applies, to the input image, the Gaussian filter having a filter coefficient in which the standard deviation σ2 is equal to the standard deviation σ1 when the second filter size is different from the first filter size.

2. The image processing apparatus according to claim 1, wherein when at least one of the first conversion magnification or the second conversion magnification is smaller than 1, the blurring processing unit generates the blurred image, and when the first conversion magnification and the second conversion magnification are equal to or greater than 1, the resolution conversion unit generates, from the input image, the converted image of which the resolution is converted at the first conversion magnification in the first direction and at the second conversion magnification in the second direction.

3. The image processing apparatus according to claim 1, wherein the blurring processing unit is configured to:

set the first filter size of the Gaussian filter to an odd number larger than a reciprocal of the first conversion magnification when the first conversion magnification is smaller than 1; and set the second filter size of the Gaussian filter to an odd number larger than a reciprocal of the second conversion magnification when the second conversion magnification is smaller than 1.

4. A printing system comprising:

the image processing apparatus according to claim 1;

a printing head including a plurality of nozzles and configured to eject a liquid onto a medium; and a control unit configured to control the ejection of the liquid from the printing head so that a print image based on the converted image is formed on the medium.

5. The printing system according to claim 4, further comprising a resolution receiving unit configured to receive a setting for the resolution of the converted image from among a plurality of different output resolutions under a printing condition that allows the resolution of the converted image to be set to the plurality of output resolutions, wherein the output resolutions include a first output resolution and a second output resolution different from the first output resolution, and the blurring processing unit matches the standard deviations σ1 and σ2 of the Gaussian filter applied to the input image when the resolution receiving unit receives the second output resolution to the standard deviations σ1 and σ2 of the Gaussian filter applied to the input image when the resolution receiving unit receives the first output resolution.

6. The printing system according to claim 5, further comprising a printing condition receiving unit configured to receive a setting for the printing condition from among a plurality of candidates, wherein the blurring processing unit is configured to apply the Gaussian filter to the input image using, as the standard deviations σ1 and σ2, standard deviations associated with the printing condition, of the standard deviations σi associated with each of the plurality of candidates.

7. The printing system according to claim 6, wherein the medium includes a first medium and a second medium through which the liquid is less likely to permeate than the first medium, the plurality of candidates to be served as the printing condition include a first medium candidate for forming the print image on the first medium and a second medium candidate for forming the print image on the second medium, and the blurring processing unit makes the standard deviations σ1 and σ2 of the Gaussian filter applied to the input image when the second medium candidate is received as the printing condition larger than the standard deviations σ1 and σ2 of the Gaussian filter applied to the input image when the first medium candidate is received as the printing condition.

8. The printing system according to claim 6, wherein the plurality of candidates to be served as the printing condition include a first image candidate that gives priority to sharpness of a line drawing included in the input image, and a second image candidate that gives priority to gradation of the input image, and the blurring processing unit makes the standard deviations σ1 and σ2 of the Gaussian filter applied to the input image when the second image candidate is received as the printing condition larger than the standard deviations σ1 and σ2 of the Gaussian filter applied to the input image when the first image candidate is received as the printing condition.

9. The printing system according to claim 4, wherein the blurring processing unit is configured to:

receive an operation of setting a standard deviation σ of the Gaussian filter applied to the input image on a user interface screen; and apply, to the input image, the Gaussian filter having the filter coefficient with the received standard deviation σ as the standard deviations σ1 and σ2.

10. An image processing method of acquiring a converted image of which a resolution is converted based on an input image including a plurality of pixels arranged in a first direction and in a second direction intersecting the first direction, the image processing method comprising:

a blurring processing step of generating a blurred image by applying, to the input image, a two-dimensional Gaussian filter having a first filter size in the first direction and a second filter size in the second direction; and a resolution conversion step of generating, from the blurred image, the converted image of which the resolution is converted at a first conversion magnification that is a conversion magnification of the resolution in the first direction and at a second conversion magnification that is a conversion magnification of the resolution in the second direction, wherein the second conversion magnification is larger than the first conversion magnification when the first filter size is larger than the second filter size in the blurring processing step, the first conversion magnification is larger than the second conversion magnification when the second filter size is larger than the first filter size in the blurring processing step, a standard deviation σ of the Gaussian filter in the first direction is set to be a standard deviation σ1, a standard deviation σ of the Gaussian filter in the second direction is set to be a standard deviation σ2, and the Gaussian filter having a filter coefficient in which the standard deviation σ2 is equal to the standard deviation σ1 is applied to the input image when the second filter size is different from the first filter size in the blurring processing step.

* * * * *